(12) United States Patent
Schädel et al.

(10) Patent No.: US 11,332,628 B2
(45) Date of Patent: May 17, 2022

(54) 3D PRINTED COMPONENT PART COMPRISING A MATRIX MATERIAL-BORON NITRIDE COMPOSITE, METHOD FOR MAKING A 3D PRINTED COMPONENT PART AND USE OF A 3D PRINTED COMPONENT PART

(71) Applicant: 3M INNOVATIVE PROPERTIES COMPANY, St. Paul, MN (US)

(72) Inventors: Robert M. Schädel, Waltenhofen (DE); Krishna B. Uibel, Waltenhofen (DE); Stefanie Wildhack, Kempten (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/271,800

(22) PCT Filed: Aug. 27, 2019

(86) PCT No.: PCT/IB2019/057208
§ 371 (c)(1),
(2) Date: Feb. 26, 2021

(87) PCT Pub. No.: WO2020/044234
PCT Pub. Date: Mar. 5, 2020

(65) Prior Publication Data
US 2021/0340391 A1    Nov. 4, 2021

(30) Foreign Application Priority Data
Aug. 29, 2018    (EP) .................................... 18191391

(51) Int. Cl.
| | | |
|---|---|---|
| *C09D 11/037* | (2014.01) | |
| *B33Y 70/10* | (2020.01) | |
| *C09D 11/107* | (2014.01) | |
| *B29C 64/106* | (2017.01) | |
| *B33Y 10/00* | (2015.01) | |
| *B29K 105/18* | (2006.01) | |
| *B29K 509/04* | (2006.01) | |

(52) U.S. Cl.
CPC ............ *C09D 11/037* (2013.01); *B33Y 70/10* (2020.01); *C09D 11/107* (2013.01); *B29C 64/106* (2017.08); *B29K 2105/18* (2013.01); *B29K 2509/04* (2013.01); *B33Y 10/00* (2014.12)

(58) Field of Classification Search
CPC ..... C09D 11/037; C09D 11/017; B33Y 70/10; B33Y 10/00; B29C 64/106; B29K 2105/18; B29K 2509/04
See application file for complete search history.

(56) References Cited

U.S. PATENT DOCUMENTS

| | | | |
|---|---|---|---|
| 2016/0107379 A1* | 4/2016 | Mark ................. | G05B 19/4099 264/308 |
| 2016/0121546 A1 | 5/2016 | Yao | |
| 2016/0263791 A1 | 9/2016 | Uibel | |

FOREIGN PATENT DOCUMENTS

| | | |
|---|---|---|
| CN | 205601184 | 9/2016 |
| EP | 3242908 | 11/2017 |
| JP | 2017-213813 | 12/2017 |
| WO | WO 2012-062627 | 5/2012 |
| WO | WO 2014-209994 | 12/2014 |
| WO | WO 2015-055552 | 4/2015 |
| WO | WO 2015-120429 | 8/2015 |
| WO | WO 2016-134984 | 9/2016 |
| WO | WO 2016-198425 | 12/2016 |
| WO | WO 2020-044236 | 3/2020 |

OTHER PUBLICATIONS

HeboFill(R) 501 Technical Datasheet, Special Chem (No Date).*
Nozomi et al., machine English translation of JP 2017-213813 (Year: 2017).*
Technical Datasheet: "HeBoFill 501", A product of Henze BNP A.G, Jun. 2016, pp. 1-2.
International Search report for PCT International Application No. PCT/IB2019/057208 dated Dec. 13, 2019, 4 pages.
1507 Extended EP Search Report for E18191391.4, PCT/IB2019/057208, dated Feb. 6, 2019, 3 pages.

* cited by examiner

Primary Examiner — Jessica M Roswell
(74) Attorney, Agent, or Firm — Thomas M. Spielbauer

(57) ABSTRACT

The present disclosure relates to a filamentary structure manufactured during 3D printing by liquid deposition modelling, the filamentary structure comprising a continuous strand comprising a matrix material and filler particles, wherein the filler particles comprise hexagonal boron nitride particles comprising hexagonal boron nitride platelets. The present disclosure further relates to a 3D printable ink composition for manufacturing said filamentary structure, to a 3D printed component part formed from said filamentary structure, to a 3D printing method for making said 3D printed component part, and to the use of said component part.

13 Claims, 11 Drawing Sheets

3D PRINTED COMPONENT PART COMPRISING A MATRIX MATERIAL-BORON NITRIDE COMPOSITE, METHOD FOR MAKING A 3D PRINTED COMPONENT PART AND USE OF A 3D PRINTED COMPONENT PART

CROSS REFERENCE TO RELATED APPLICATIONS

This application is a national stage filing under 35 U.S.C. 371 of PCT/IB2019/057208, filed Aug. 27, 2019, which claims the benefit of European Application No. 18191391.4, filed Aug. 29, 2018, the disclosure of which is incorporated by reference in their entirety herein.

TECHNICAL FIELD

The present disclosure relates to a 3D printed component part comprising a matrix material-boron nitride composite.

BACKGROUND

Thermally conductive polymer compounds are used for thermal management solutions. For electronic devices, like in mobile devices, for LED technology or for electric vehicles, there is a growing demand for thermally conductive and electrically insulating polymer materials. To improve performance of these materials, thermal conductivity needs to be increased. To this end, thermally conductive fillers are used such as alumina and boron nitride. Hexagonal boron nitride is an electrically insulating and highly heat-conductive filler having a platelet-shaped particle morphology and highly anisotropic thermal conductivity properties. Anisotropic thermal conductivity properties are desired for many applications. For certain applications, such as applications where thermal transfer takes place at relatively large surface areas such as in batteries for electric vehicles, a high through-plane thermal conductivity is required. For other applications, such as for very thin thermal interface materials, or for LED applications where heat needs to be removed from small spots also referred to as "hot spots", a high in-plane thermal conductivity is required. In this case the heat is spread by the high in-plane thermal conductivity into the foil.

During processing of polymer-boron nitride compounds, for example by injection molding, the platelet-shaped particles are oriented parallelly to the wall of the injection-molded component part in the regions close to the wall, whereas they are oriented perpendicularly or randomly in the core region of the component part. The resulting thermal conductivity is a mean value of the regions near the wall and the core region. The degree of orientation of boron nitride platelets in injection-molded parts is strongly dependent on the dimensions, particularly thickness, of the injection-molded part and can be influenced by injection molding parameters only to a minor extent. By injection molding parameters, the ratio between in-plane and through-plane thermal conductivity can be influenced only within narrow borders.

Component parts made from polymer materials can be manufactured by 3D printing. One method of 3D printing is the so-called liquid deposition modelling. For liquid deposition modelling of polymer materials, a liquid ink is used containing a polymer in liquid form which is hardened during or after 3D printing.

In WO 2015/120429 A1, 3D printed component parts are made with polymers filled with fiber-shaped particles. During 3D printing, the nozzle is rotated which leads to a helical orientation of the fiber-shaped particles and to an increase of the mechanical strength of the component parts.

There is still a need for polymer-boron nitride component parts having a high in-plane thermal conductivity, and being economically producible. Furthermore, there is still a need for polymer-boron nitride component parts having a high through-plane thermal conductivity, and being economically producible.

As used herein, "a", "an", "the", "at least one" and "one or more" are used interchangeably. The term "comprise" shall include also the terms "consist essentially of" and "consists of".

SUMMARY

In a first aspect, the present disclosure relates to a filamentary structure manufactured during 3D printing by liquid deposition modelling, the filamentary structure comprising a continuous strand comprising a matrix material and filler particles, wherein the filler particles comprise hexagonal boron nitride particles comprising hexagonal boron nitride platelets, and wherein the ratio of the width of the continuous strand to the height of the continuous strand is either more than 2 or less than 1.

In another aspect, the present disclosure also relates to a 3D printable ink composition for manufacturing the filamentary structure disclosed herein during 3D printing, wherein the ink composition comprises a matrix material and filler particles, wherein the filler particles comprise hexagonal boron nitride particles comprising hexagonal boron nitride platelets.

In yet a further aspect, the present disclosure relates to a 3D printed component part comprising at least one portion formed from the filamentary structure disclosed herein.

In yet a further aspect, the present disclosure relates to a 3D printing method for making the 3D printed component part disclosed herein, the method comprising providing an ink composition, the ink composition comprising a matrix material and filler particles, wherein the filler particles comprise hexagonal boron nitride particles comprising hexagonal boron nitride platelets;

extruding a continuous strand from a nozzle and depositing the continuous strand on a substrate in a predetermined pattern layer by layer to form a filamentary structure, wherein the continuous strand comprises the ink composition; and hardening the filamentary structure to form a 3D printed component part comprising a hardened matrix material and the hexagonal boron nitride particles comprising hexagonal boron nitride platelets dispersed therein, the hexagonal boron nitride platelets having a predetermined orientation in the hardened matrix material.

In yet a further aspect, the present disclosure relates to the use of the component part disclosed herein as thermal conduction means to control the temperature of electrical and electronic components or assemblies or batteries.

By the method for making the 3D printed component part disclosed herein, a flexible method is provided which is able to produce matrix material-boron nitride component parts having either a high in-plane thermal conductivity or a high through-plane thermal conductivity, as the application demands and depending on the selected printing parameters. The method for making the 3D printed component part disclosed herein is cost-effective.

Surprisingly, by the method disclosed herein 3D printed component parts can be obtained having a high degree of orientation of the boron nitride platelets, the boron nitride platelets being oriented to a high degree either parallelly to the substrate on which the 3D component part is printed, or being oriented to a high degree perpendicularly to the substrate on which the 3D component part is printed. 3D printed component parts with a predetermined direction of orientation, either parallelly or perpendicularly to the substrate, and with a predetermined level of orientation, can be obtained. A core region as for injection-molded parts can be avoided, and 3D printed component parts which are intended to have a high in-plane thermal conductivity have a higher in-plane thermal conductivity compared to injection-molded parts. For 3D printed component parts which are intended to have a high through-plane thermal conductivity, boron nitride platelets can be oriented perpendicularly to the substrate and therefore higher through-plane thermal conductivities can be obtained compared to injection molded parts for which thermal conductivity is a mixed value of the core and shell regions. For conventional shaping methods of thin component parts such as injection molding or extrusion of thin sheets, the in-plane thermal conductivity is higher than the through-plane thermal conductivity. For 3D component parts which are intended to have a high through-plane thermal conductivity, the through-plane thermal conductivity may be higher than the in-plane thermal conductivity.

Surprisingly, 3D printed component parts with highly oriented boron nitride platelets can be obtained by the method disclosed herein, even if this is not achievable with other 3D printing methods such as stereolithography and powder bed printing.

The 3D printed component part disclosed herein comprises highly oriented boron nitride platelets and consequently highly anisotropic properties, particularly highly anisotropic thermal conductivity properties. By the present disclosure, 3D printed component parts can be obtained having a predetermined high in-plane or high through-plane thermal conductivity, and with a predetermined level of thermal conductivity, either in-plane or through-plane, and with a predetermined ratio of in-plane to through-plane thermal conductivity.

In some embodiments, the 3D printed component part disclosed herein comprises boron nitride platelets oriented parallelly to the substrate and having a high in-plane thermal conductivity.

In some embodiments, the 3D printed component part disclosed herein comprises boron nitride platelets oriented perpendicularly to the substrate and having a high through-plane thermal conductivity.

The direction of heat flow in the 3D printed component part is predetermined during printing by the choice of infill patterns, printing parameters and nozzle designs over the complete component part or selected portions of the component part. Thermal path ways in the 3D printed component part can be built up three-dimensionally by connected arrangement of portions having a high in-plane conductivity and portions having a high through-plane conductivity.

By the method disclosed herein, 3D printing of a thermally conductive component part directly into an electronic device from which heat has to be dissipated is possible, having the advantage that the component part adheres to the electronic device without using clips or glues. For injection molded parts having the same dimensions as the 3D printed component part, a joining technology would be needed.

3D printing of a thermally conductive component part directly into an electronic device has the additional advantage that the component part is in closest connection to the components of the electronic device for transferring the heat. For injection molded parts having the same dimensions as the 3D printed component part, a gap filler material such as a thermally conductive paste would be needed to fill the gap between the electronic device and the injection molded part.

By the method disclosed herein, 3D printing of a thermally conductive component part can be used to join parts and simultaneously transfer the heat between parts. Examples of such parts are central processing unit (CPU) and copper heat pipe, or CPU and heat spreading plate made of copper or strongly oriented graphite sheets.

BRIEF DESCRIPTION OF THE DRAWINGS

The present disclosure is explained in more detail on the basis of the drawings, in which FIGS. 1 A-1 D, 2 A-2 D, 3 A-3 D, 4 A-4 D, 5 A-5 D, 6 A-6 D, 7 A-7 D, 8 A-8 D and 9 A-9 D schematically show various nozzle arrangements that can be used for extruding a continuous strand during 3D printing of the filamentary structure disclosed herein.

DETAILED DESCRIPTION

Figure 1A:
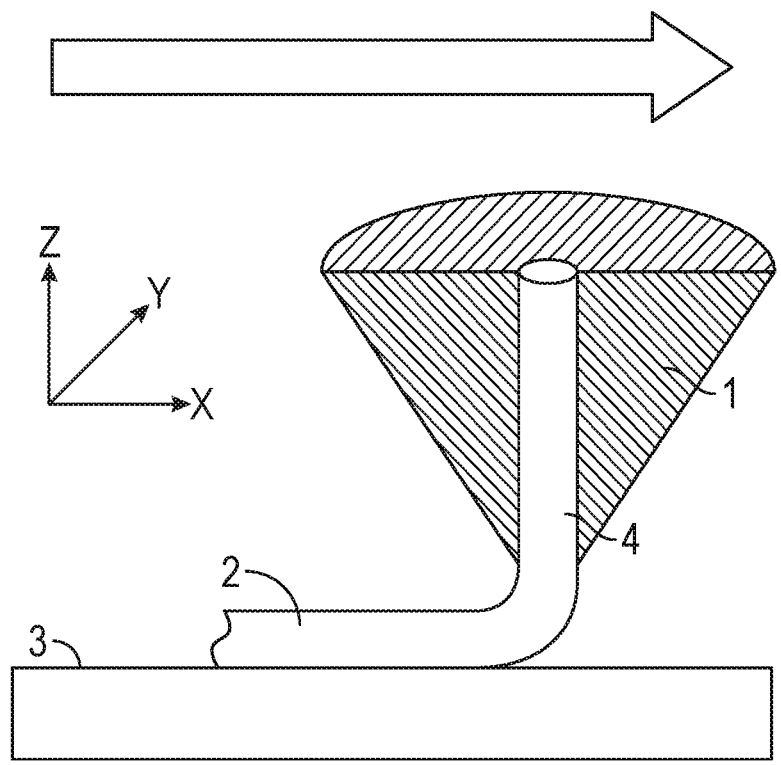
Figure 1B:
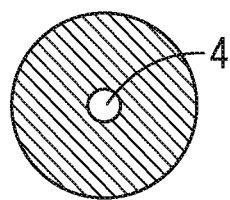
Figure 1C:
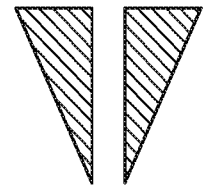
Figure 1D:
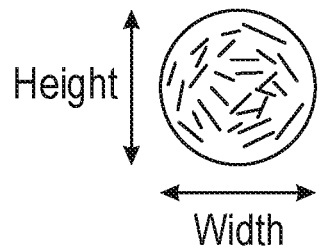
Figure 2A:
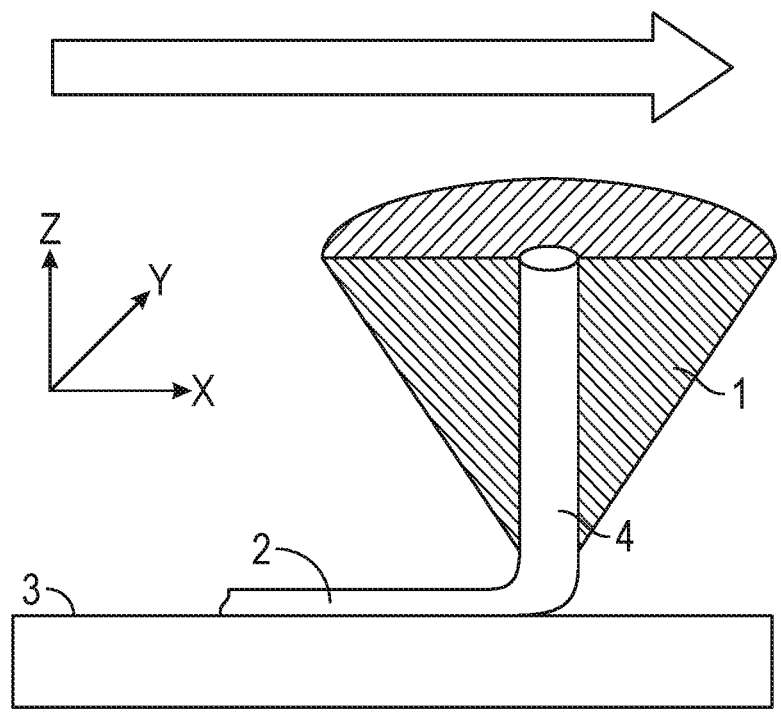
Figure 2B:
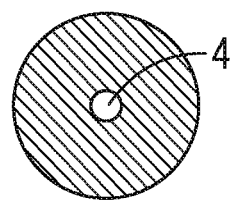
Figure 2C:
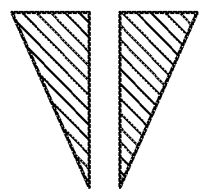
Figure 2D:
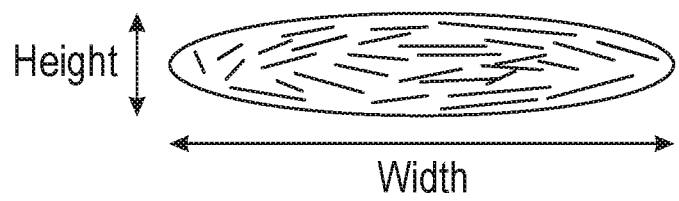
Figure 3A:
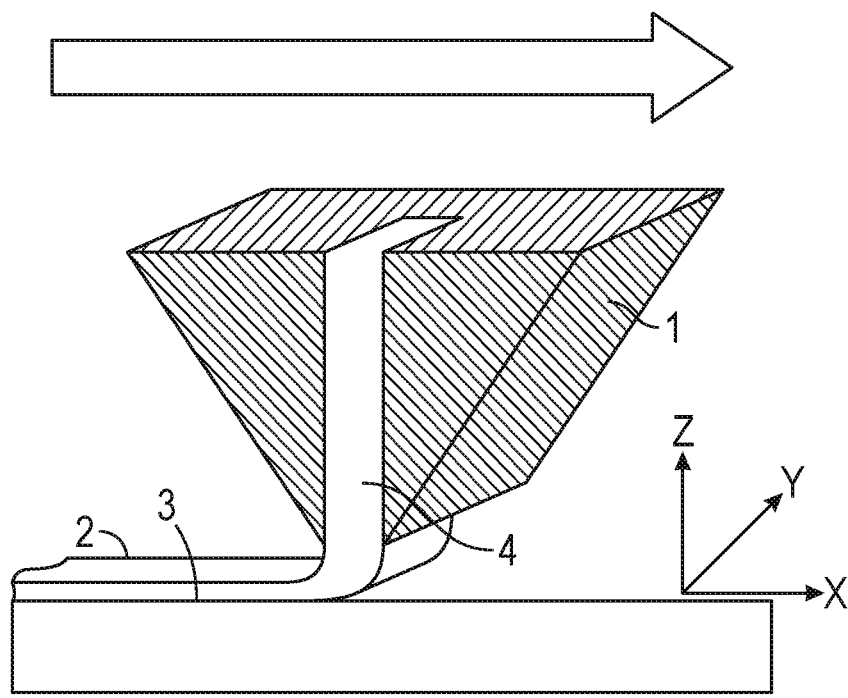
Figure 3B:
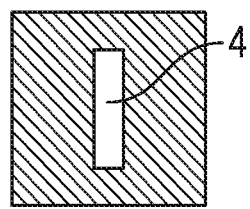
Figure 3C:
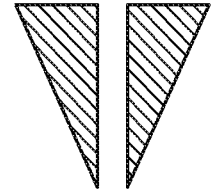
Figure 3D:
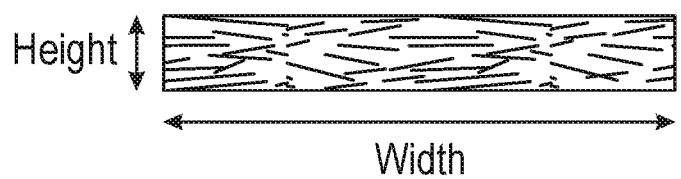
Figure 4A:
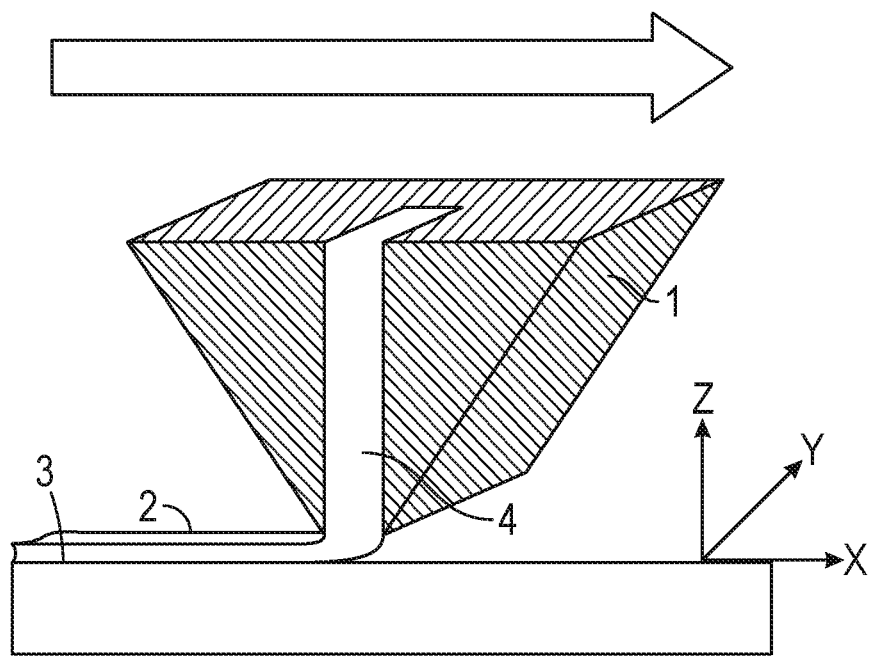
Figure 4B:
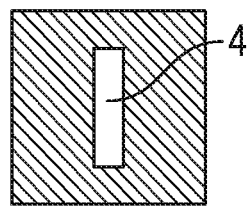
Figure 4C:
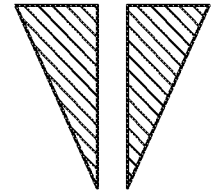
Figure 4D:
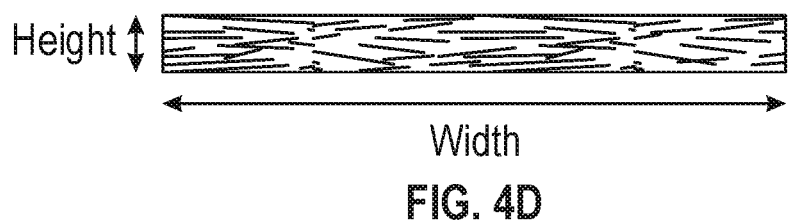
Figure 5A:
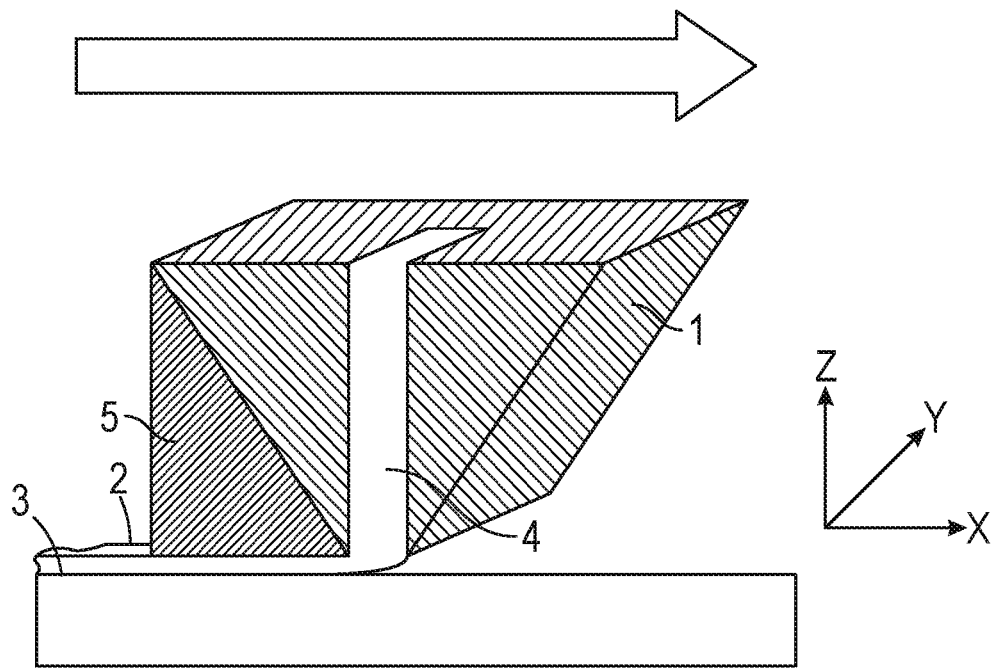
Figure 5B:
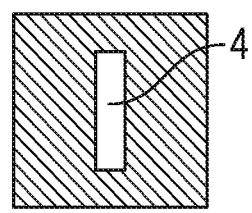
Figure 5C:
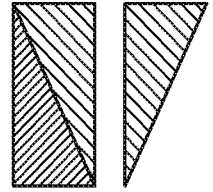
Figure 5D:
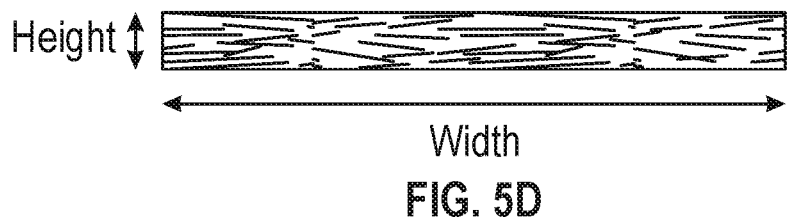
Figure 6A:
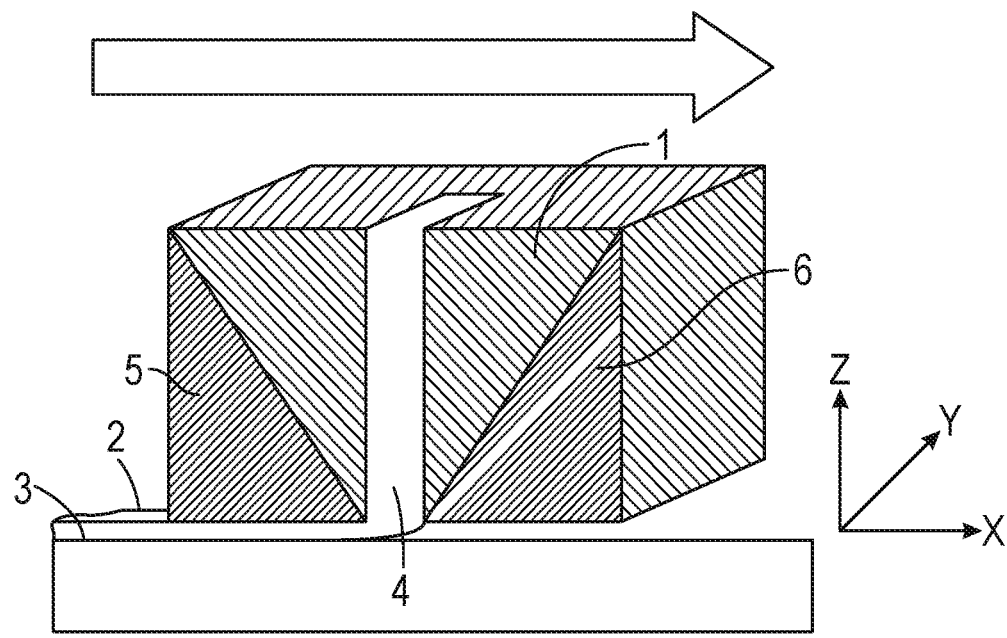
Figure 6B:
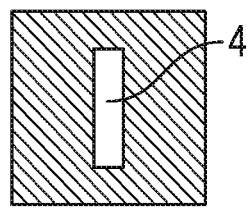
Figure 6C:
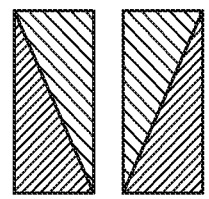
Figure 6D:
Figure 7A:
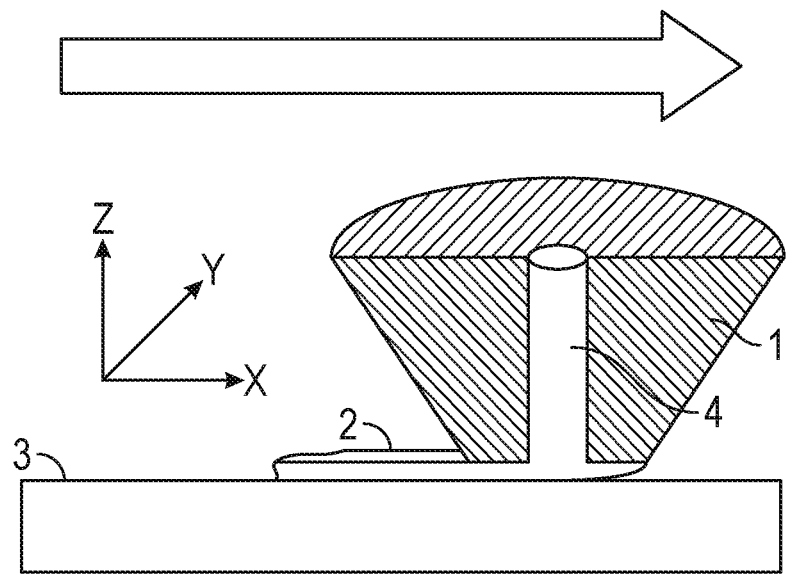
Figure 7B:
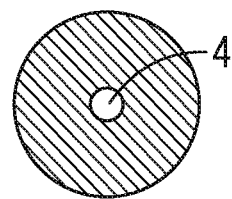
Figure 7C:
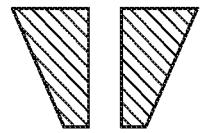
Figure 7D:
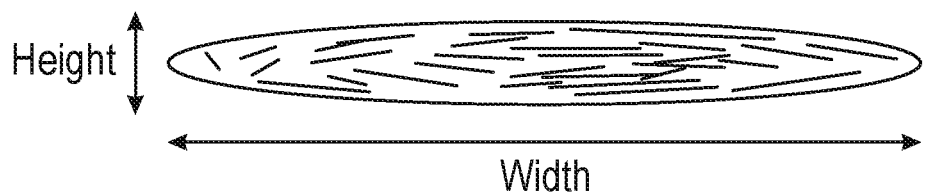
Figure 8A:
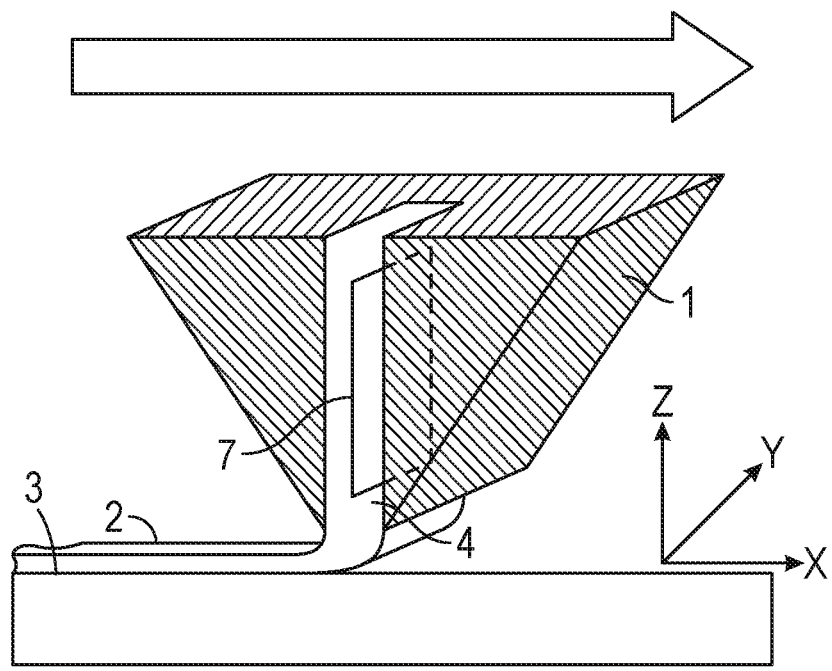
Figure 8B:
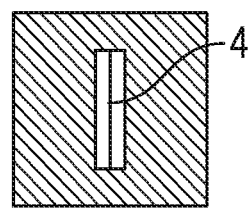
Figure 8C:
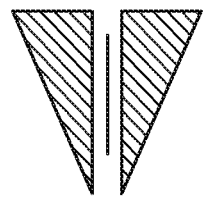
Figure 8D:
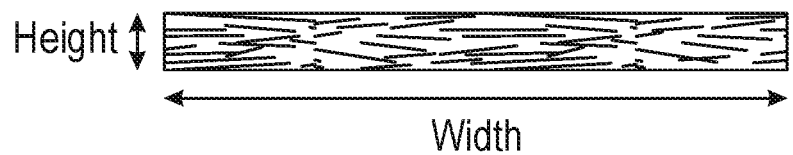
Figure 9A:
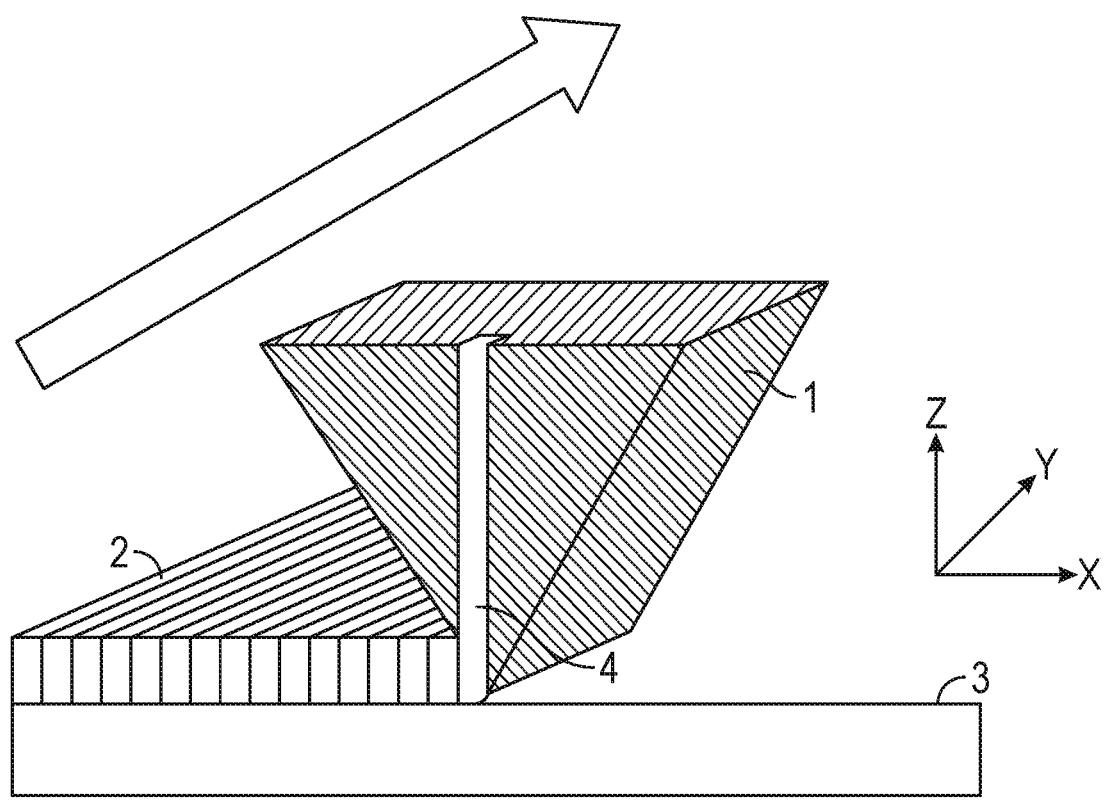
Figure 9B:
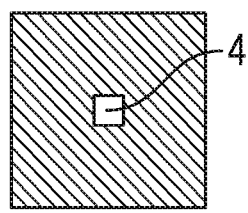
Figure 9C:
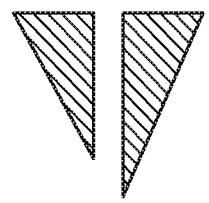
Figure 9D:
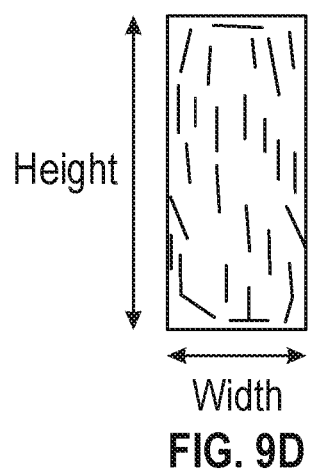

The filamentary structure disclosed herein is manufactured during 3D printing by liquid deposition modelling. Liquid deposition modelling is a method of additive manufacturing or 3D printing for which a liquid ink is used and extruded through a nozzle and deposited on a substrate, thereby producing a filamentary structure comprising a continuous strand of deposited material. The continuous strand comprises a matrix material and filler particles.

As used herein, "a continuous strand" means that either one continuous strand is deposited, or a plurality of continuous strands is deposited.

The ratio of the width of the continuous strand to the height of the continuous strand is either more than 2 or less than 1.

The filler particles comprise hexagonal boron nitride (hBN) particles. The hexagonal boron nitride particles comprise hexagonal boron nitride platelets. As used herein, "platelets" means platelet-shaped particles.

The boron nitride platelets typically have a mean aspect ratio of more than 7. The aspect ratio is the ratio of the diameter to the thickness of the boron nitride platelets. More specifically, the mean aspect ratio of the boron nitride platelets may be at least 10, or at least 15, or at least 20. The mean aspect ratio of the boron nitride platelets may also be up to 40, or up to 100. The mean aspect ratio of the boron nitride platelets may be from 7 to 20, or from 20 to 40, or from 7 to 40, or from 10 to 40, or from 50 to 100. Typically, the mean aspect ratio of the boron nitride platelets is at most 500. The mean aspect ratio can be measured by scanning electron microscopy (SEM), by determining the aspect ratio of 20 particles, and calculating the mean value of the 20 individual values determined for the aspect ratio. The aspect ratio of an individual boron nitride platelet is determined by measuring the diameter and the thickness of the boron nitride platelet and calculating the ratio of the diameter to the thickness. Required magnification of the SEM images used to measure diameter and thickness of boron nitride platelets depends on the size of the platelets Magnification should be at least 1000×, preferably at least 2000×. Where appropriate, i.e. for smaller platelets with a mean particle size ($d_{50}$) of 5 to 10 μm, a magnification of 5000× should be used.

Typically, the mean particle size ($d_{50}$) of the boron nitride platelets and of the boron nitride particles is at least 5 μm. The mean particle size ($d_{50}$) of the boron nitride platelets and of the boron nitride particles may be at least 7 μm, or at least 10 μm, or at least 12 μm, or at least 15 μm, or at least 20 μm, or at least 30 μm. Typically, the mean particle size ($d_{50}$) of the boron nitride platelets is at most 100 μm, and the mean particle size ($d_{50}$) of the boron nitride particles is at most 250 μm. The mean particle size ($d_{50}$) of the boron nitride platelets and of the boron nitride particles may be at most 80 μm, or at most 60 μm, or at most 50 μm, or at most 30 μm. The mean particle size ($d_{50}$) of the boron nitride platelets and of the boron nitride particles may be from 5 to 100 μm. More specifically, the mean particle size ($d_{50}$) of the boron nitride platelets and of the boron nitride particles may be from 5 to 50 μm, or from 5 to 30 μm, or from 10 to 30 μm, or from 15 to 35 μm, or from 15 to 50 μm or from 30 to 50 μm. The mean particle size ($d_{50}$) can be measured by laser diffraction.

A portion of the hexagonal boron nitride platelets may be agglomerated to form boron nitride agglomerates. The mean particle size ($d_{50}$) of the boron nitride agglomerates may be at most 250 μm and more specifically at most 200 μm, at most 150 μm or at most 100 μm. The mean particle size ($d_{50}$) of the boron nitride agglomerates may be at least 50 μm or at least 70 μm. The mean particle size ($d_{50}$) can be measured by laser diffraction. Typically, less than 50% of the hexagonal boron nitride platelets are agglomerated, and at least 50% of the hexagonal boron nitride platelets are used as non-agglomerated particles, that means as primary particles. Also mixtures of agglomerates and non-agglomerated primary particles may be used. The boron nitride agglomerates may be spherical, irregularly shaped or flake-shaped, the flake-shaped agglomerates having an aspect ratio of from 1 to 20.

The hexagonal boron nitride particles may also comprise particles which have a low aspect ratio. A "low aspect ratio" means that the hexagonal boron nitride particles have an aspect ratio of at most 7. Typically, the proportion of hexagonal boron nitride particles with a low aspect ratio is at most 50% and more specifically at most 35% or at most 20%, based on the total amount of hexagonal boron nitride particles. The hexagonal boron nitride particles with a low aspect ratio may be agglomerated to form boron nitride agglomerates. The mean particle size ($d_{50}$) of the boron nitride agglomerates formed from boron nitride particles with a low aspect ratio may be at most 250 μm and more specifically at most 200 μm, at most 150 μm or at most 100 μm. The mean particle size ($d_{50}$) of the boron nitride agglomerates formed from boron nitride particles with a low aspect ratio may be at least 20 μm or at least 50 μm. The mean particle size ($d_{50}$) can be measured by laser diffraction. The boron nitride agglomerates formed from boron nitride particles with a low aspect ratio may be spherical, irregularly shaped or flake-shaped, the flake-shaped agglomerates having an aspect ratio or from 1 to 20. The hexagonal boron nitride particles with a low aspect ratio may also be used as non-agglomerated particles, that means as primary particles. Also mixtures of agglomerates and non-agglomerated primary particles with a low aspect ratio may be used. The hexagonal boron nitride particles may also comprise boron nitride agglomerates that comprise boron nitride platelets and boron nitride particles with a low aspect ratio.

The hexagonal boron nitride particles and the hexagonal boron nitride platelets typically have a content of water-soluble boron compounds such as boron oxide of at most 0.2 percent by weight, based on the total amount of hexagonal boron nitride particles or hexagonal boron nitride platelets, respectively.

The filler particles may further comprise secondary fillers with a high aspect ratio, different from hexagonal boron nitride particles. The secondary fillers may be thermally conductive. The use of high aspect ratio secondary fillers enhances the predetermined orientation of boron nitride platelets in the continuous strand and enhances the directed thermal conductivity by the intrinsic thermal conductivity of the secondary filler. The aspect ratio of the high aspect ratio secondary fillers may be at least 5, or at least 10. The aspect ratio of the high aspect ratio secondary fillers may be up to 50, or up to 100. The secondary fillers having a high aspect ratio may be platelet shaped particles, or needle or fiber shaped particles. Examples for platelet shaped particles are platelet shaped ceramic platelets such as alpha alumina platelets, and platelet shaped mineral particles such as layered silicates and talcum powder comprising talcum platelets. Examples for needle or fiber shaped particles are chopped fibers made of alumina or silica, and needle shaped mineral fillers such as wollastonite. The mean particle size ($d_{50}$) of the platelet shaped, high aspect ratio secondary fillers may be from 5 to 100 μm. The diameter of the needle or fiber shaped high aspect ratio secondary fillers may be from 1 to 25 μm.

The filler particles may further comprise secondary fillers having a low aspect ratio of less than 5, different from hexagonal boron nitride. The mean particle size ($d_{50}$) of the low aspect ratio secondary fillers is less than 2 μm.

In some embodiments of the present disclosure, the filler particles consist of hexagonal boron nitride particles comprising hexagonal boron nitride platelets, of secondary fillers with a high aspect ratio of at least 5 or at least 10, and of secondary fillers with a low aspect ratio of less than 5 and a mean particle size ($d_{50}$) of less than 2 μm. In some embodiments of the present disclosure, the filler particles consist of hexagonal boron nitride particles comprising hexagonal boron nitride platelets, and of secondary fillers with a high aspect ratio of at least 5 or at least 10, and the filler particles do not comprise low aspect ratio secondary fillers. In some embodiments, the average value of the aspect ratio of the filler particles used is at least 10. In some embodiments, the filler particles consist of hexagonal boron nitride particles comprising hexagonal boron nitride platelets.

The matrix material may be a polymer resin or a sol-gel system. The polymer resin may be selected from the group consisting of acrylic resins, epoxy resins, polyurethane resins, silicone resins, phenolic resins and mixtures thereof. The polymer resin may also be an adhesive polymer resin. The sol-gel system may be selected from the group consisting of silica based sol-gel systems, alumina based sol-gel systems and titania based sol-gel systems. Preferred sol-gel systems are ethanolic silica based sol-gel systems.

The continuous strand may comprise 5 to 80 percent by volume of hexagonal boron nitride particles, based on the total amount of the continuous strand. More specifically, the continuous strand may comprise 10 to 60 percent by volume of hexagonal boron nitride particles, based on the total amount of the continuous strand. The continuous strand may comprise 5 to 80 percent by volume of filler particles, based on the total amount of the continuous strand. The continuous strand may comprise up to 72 percent by volume, or up to 64 percent by volume, of secondary fillers, based on the total amount of the continuous strand. The secondary fillers may be high aspect ratio secondary fillers or low aspect ratio secondary fillers or both.

The continuous strand may comprise 20 to 95 percent by volume of matrix material, based on the total amount of the continuous strand. More specifically, the continuous strand may comprise 40 to 90 percent by volume of matrix material, based on the total amount of the continuous strand.

In some embodiments of the filamentary structure disclosed herein, the ratio of the width of the continuous strand to the height of the continuous strand is more than 2. More specifically, the ratio of the width of the continuous strand to the height of the continuous strand may be at least 3, or at least 4, or at least 5, or at least 10, or at least 20. The ratio of the width of the continuous strand to the height of the continuous strand may be at most 100. As used herein, the ratio of the width of the continuous strand to the height of the continuous strand may also be referred to as the aspect ratio of the continuous strand. The aspect ratio of the continuous strand may be from more than 2 to 50, or from 3 to 50, or from 5 to 50, or from 10 to 50, or from 5 to 40, or from 10 to 40, or from 15 to 50, or from 5 to 100.

If the ratio of the width of the continuous strand to the height of the continuous strand is more than 2, the height of the continuous strand may be 500 µm or less. More specifically, the height of the continuous strand may be at most 200 µm, or at most 100 µm. The height of the continuous strand may also be at most 50 µm, or even at most 20 µm. The height of the continuous strand may be selected depending on the specific application.

If the ratio of the width of the continuous strand to the height of the continuous strand is more than 2, high in-plane thermal conductivities can be obtained.

In some embodiments of the filamentary structure disclosed herein, the ratio of the width of the continuous strand to the height of the continuous strand is less than 1. More specifically, the ratio of the width of the continuous strand to the height of the continuous strand may be at most 0.9, or at most 0.7, or at most 0.5. The ratio of the width of the continuous strand to the height of the continuous strand may also be at most 0.3, or at most 0.1. The aspect ratio of the continuous strand may be less than 1 and at least 0.05, or at least 0.01. The aspect ratio of the continuous strand may be from 0.1 to less than 1, or from 0.1 to 0.9, or from 0.1 to 0.7, or from 0.1 to 0.5, or from 0.5 to less than 1, or from 0.5 to 0.9, or from 0.5 to 0.7, or from 0.01 to 0.5.

If the ratio of the width of the continuous strand to the height of the continuous strand is less than 1, the height of the continuous strand may be up to 2 mm. More specifically, the height of the continuous strand may be up to 1 mm, or up to 500 µm, or up to 200 µm. The height of the continuous strand may be selected depending on the specific application.

If the ratio of the width of the continuous strand to the height of the continuous strand is less than 1, high through-plane thermal conductivities can be obtained.

In some embodiments of the filamentary structure disclosed herein, the continuous strand comprises portions being oriented parallelly to one another. Preferably, a large proportion of the continuous strand comprises portions being oriented parallelly to one another. For example, at least 10% of the continuous strand may comprise portions being oriented parallel to one another, or at least 25%, or at least 50%, or at least 70%, or at least 90% of the continuous strand may comprise portions being oriented parallelly to one another.

The continuous strand may comprise portions having close contact to one another, or may comprise portions that overlap each other. The overlap may be to an extent of 10 to 50%. The continuous strand may also comprise portions which are crossing each other.

Further disclosed herein is a 3D printable ink composition for manufacturing the filamentary structure disclosed herein during 3D printing. The ink composition comprises a matrix material and filler particles. The filler particles comprise hexagonal boron nitride particles comprising hexagonal boron nitride platelets. The composition comprising a matrix material and filler particles is used as manufacturing material in a 3D printing process for extruding the filamentary structure.

The 3D printable ink composition may comprise 5 to 40 percent by volume of hexagonal boron nitride particles, based on the total amount of the 3D printable ink composition. More specifically, the 3D printable ink composition may comprise 10 to 35 percent by volume of hexagonal boron nitride particles, based on the total amount of the 3D printable ink composition. The 3D printable ink composition may comprise 5 to 40 percent by volume of filler particles, based on the total amount of the 3D printable ink composition.

The 3D printable ink composition may comprise 60 to 95 percent by volume of matrix material, based on the total amount of the 3D printable ink composition. More specifically, the 3D printable ink composition may comprise 65 to 90 percent by volume of matrix material, based on the total amount of the 3D printable ink composition.

The hexagonal boron nitride particles comprising hexagonal boron nitride platelets and the matrix material that are used for the 3D printable ink composition have been described above in more detail. If a polymer resin is used as matrix material, the 3D printable ink composition may comprise an uncured polymer resin and a curing agent. The ratio of uncured polymer resin to curing agent may be from 10:1 to 1:1.

The uncured polymer resin may comprise filler particles comprising hexagonal boron nitride particles, or the curing agent may comprise filler particles comprising hexagonal boron nitride particles, or both the uncured polymer resin and the curing agent may comprise filler particles comprising hexagonal boron nitride particles.

The viscosity of the 3D printable ink composition may be in the range of 1 mPa*s up to 7,000,000 mPa*s. More specifically, the viscosity of the 3D printable ink composition may be from 1000 mPa*s to 5,000,000 mPa*s or from 2000 mPa*s to 4,000,000 mPa*s. The viscosity can be selected depending on the dispenser technology and the application.

In some embodiments, for high aspect ratios of the continuous strand of more than 2 and high in-plane thermal conductivities, 3D printable ink compositions with low viscosities of 5,000 to 50,000 mPa*s, more specifically of 10,000 to 20,000 mPa*s, may be used, and the ink may be transported to the nozzle using a peristaltic pump. In some embodiments, for low aspect ratios of the continuous strand of less than 1 and high through-plane thermal conductivities, 3D printable ink compositions with high viscosities of 1,000,000 to 10,000,000 mPa*s may be used, and the ink may be transported to the nozzle using a progressive cavity pump. Viscosity can be measured using a Brookfield viscosimeter.

The 3D printable ink composition may further comprise a solvent, more specifically an organic solvent. The organic solvent can be used to dilute the matrix material. The organic solvent may be selected from the group consisting of alcohols, aromatic hydrocarbons, aliphatic hydrocarbons, ketones and esters. Suitable alcohols are ethanol and isopropyl alcohol, a suitable aromatic hydrocarbon is toluene, suitable aliphatic hydrocarbons are hexane and heptane, suitable ketones are methyl ethyl ketone and acetone, and a suitable ester is ethyl acetate.

By using a solvent, the content of boron nitride filler in the 3D printed component part can be increased. During or subsequent to printing a layer, the solvent evaporates and the filler content of the printed layer increases. By this method, the filler content of the 3D printed component part can be increased to up to 80 vol.-% and more.

If a solvent is used, the 3D printable ink composition may comprise 5 to 40 percent by volume of hexagonal boron nitride particles, based on the total amount of the 3D printable ink composition, and the at least one portion of the 3D printed component part formed from the filamentary structure disclosed herein may comprise 5 to 80 percent by volume of hexagonal boron nitride particles, based on the total amount of the at least one portion of the 3D printed component part formed from the filamentary structure disclosed herein.

If no solvent is used, the 3D printable ink composition may comprise 5 to 40 percent by volume of hexagonal boron nitride particles, based on the total amount of the 3D printable ink composition, and the at least one portion of the 3D printed component part formed from the filamentary structure disclosed herein may comprise 5 to 40 percent by volume of hexagonal boron nitride particles, based on the total amount of the at least one portion of the 3D printed component part formed from the filamentary structure disclosed herein. In some embodiments, when a polymer resin is used as matrix material, the polymer resin, for example an acrylic resin, contains organic volatile compounds that are not crosslinked during curing. Evaporation of these organic volatile compounds during or subsequent to printing can increase the solid filler content of the cured compound, and the at least one portion of the 3D printed component part formed from the filamentary structure disclosed herein may comprise 5 to up to 80 percent by volume of hexagonal boron nitride particles, based on the total amount of the at least one portion of the 3D printed component part formed from the filamentary structure disclosed herein.

The ink composition can be made by mixing the matrix material and the filler particles, and optionally the solvent and secondary filler particles. Mixing can be done by stirring with a paddle mixer or dissolver, for ink compositions with a viscosity of up to about 200,000 mPa*s, or by the use of a kneeder or an extruder, for ink compositions with a viscosity of more than 200,000 mPa*s and up to about 10,000,000 mPa*s. For laboratory purposes, mixing of the ink composition can be done by a dual asymmetric centrifuge such as the Speedmixer™ available from Hauschild, Hamm, Germany, for ink compositions with a viscosity of from 1 mPa*s to about 5,000,000 mPa*s.

Further disclosed herein is a 3D printed component part comprising at least one portion formed from the filamentary structure disclosed herein.

In some embodiments, at least 30% of the 3D printed component part is formed from the filamentary structure disclosed herein. In other embodiments, at least 50% or at least 80% of the 3D printed component part is formed from the filamentary structure disclosed herein. In some embodiments, 100% of the 3D printed part is formed from the filamentary structure disclosed herein. For example, if the 3D printed component part is a thin sheet or pad with a thickness of, for example, up to 1 mm, 100% of the 3D printed component part may be formed from the filamentary structure disclosed herein. Another example of a 3D printed component part of the present disclosure is a heatsink of which only one portion is formed from the filamentary structure disclosed herein and having a high in-plane thermal conductivity, e.g. in the region of contact to a CPU, and a high through-plane thermal conductivity, e.g. in the region of the cooling fins, whereas other portions of the 3D printed component such as the mounting segment may be printed with a different 3D printable ink which may have good mechanical properties and which may comprise glass fibers and no hexagonal boron nitride particles. It is also possible that one portion of the 3D printed component part is formed from the filamentary structure disclosed herein and having a ratio of the width of the continuous strand to the height of the continuous strand of more than 2, and having a high in-plane thermal conductivity, and another portion of the 3D printed component part is formed from the filamentary structure disclosed herein and having a ratio of the width of the continuous strand to the height of the continuous strand of less than 1, and having a high through-plane thermal conductivity. The texture index is measured separately on the two portions of the 3D printed component.

In some embodiments of the 3D printed component part of the present disclosure, the at least one portion of the component part formed from the filamentary structure disclosed herein has a texture index of at least 8, and the ratio of the width of the continuous strand to the height of the continuous strand in the filamentary structure is more than 2. More specifically, the texture index may be at least 10, or at least 12, or at least 15, or at least 20, or at least 30, or at least 50, or at least 100, and the ratio of the width of the continuous strand to the height of the continuous strand in the filamentary structure is more than 2. The texture index may be from 8 to 400, or from 10 to 400, or from 15 to 400, or from 8 to 300, or from 10 to 300, or from 15 to 300, and the ratio of the width of the continuous strand to the height of the continuous strand in the filamentary structure is more than 2.

If the ratio of the width of the continuous strand to the height of the continuous strand in the filamentary structure is more than 2, a high in-plane thermal conductivity can be obtained. With increasing aspect ratio of the continuous strand, the texture index and the in-plane thermal conductivity increase, and the through-plane thermal conductivity decreases. In-plane thermal conductivity is measured in a direction parallel to the substrate on which the continuous strand is deposited, through-plane thermal conductivity is measured in a direction perpendicular to the substrate on which the continuous strand is deposited.

By the texture index, the degree of orientation of the hexagonal boron nitride platelets can be measured. The texture index can be measured on the 3D component part formed from the filamentary structure disclosed herein.

The texture index is determined by an X-ray method. For this, the ratio of the intensities of the (002) and of the (100) reflection measured on X-ray diffraction diagrams is determined and is divided by the corresponding ratio for an ideal, untextured hBN sample. This ideal ratio can be determined from the JCPDS data and is 7.29. The intensity of the (002) reflection is measured within a 2Θ range from 25.8 to 27.6 degrees and that of the (100) reflection within a 2Θ range from 41.0 to 42.2 degrees. The texture index (TI) can be determined from the formula:

$$TI = \frac{I_{(002),sample} / I_{(100),sample}}{I_{(002),theoretical} / I_{(100),theoretical}} = \frac{I_{(002),sample} / I_{(100),sample}}{7.29}$$

The intensity of the (100) reflection should be at least 1.0. If the intensity of the (100) reflection is below 1.0, the measurement speed in the 2Θ ranges from 25.8 to 27.6 degrees and from 41.0 to 42.2 degrees can be decreased to obtain a sufficient intensity of the (100) reflection.

In some embodiments of the 3D printed component part of the present disclosure, the at least one portion of the component part formed from the filamentary structure disclosed herein has a texture index of less than 1, and the ratio of the width of the continuous strand to the height of the continuous strand in the filamentary structure is less than 1. More specifically, the texture index may be at most 0.9, or at most 0.8, or at most 0.5, or at most 0.2, or at most 0.1, or at most 0.05, or at most 0.01, and the ratio of the width of the continuous strand to the height of the continuous strand in the filamentary structure is less than 1. The texture index may be from 0.1 to less than 1, or from 0.1 to 0.9, or from 0.1 to 0.8, or from 0.1 to 0.5, or from 0.01 to 0.5, or from 0.03 to 0.3, and the ratio of the width of the continuous strand to the height of the continuous strand in the filamentary structure is less than 1.

If the ratio of the width of the continuous strand to the height of the continuous strand in the filamentary structure is less than 1, a high through-plane thermal conductivity can be obtained. With decreasing aspect ratio of the continuous strand, the texture index decreases and the through-plane thermal conductivity increases, and the in-plane thermal conductivity decreases.

In some embodiments of the 3D printed component part of the present disclosure, the at least one portion of the component part formed from the filamentary structure disclosed herein has a relative density of at least 60% of the theoretical density of the filamentary structure. The relative density of the at least one portion of the component part may also be at least 80% or at least 90% of the theoretical density of the filamentary structure, that is of the theoretical density of the matrix material-boron nitride compound without any pores. The density can be determined by using the Archimedes method.

The 3D printed component part disclosed herein may be made by a 3D printing method comprising providing an ink composition, the ink composition comprising a matrix material and filler particles, wherein the filler particles comprise hexagonal boron nitride particles comprising hexagonal boron nitride platelets;

extruding a continuous strand from a nozzle and depositing the continuous strand on a substrate in a predetermined pattern layer by layer to form a filamentary structure, wherein the continuous strand comprises the ink composition; and hardening the filamentary structure to form a 3D printed component part comprising a hardened matrix material and the hexagonal boron nitride particles comprising hexagonal boron nitride platelets dispersed therein, the hexagonal boron nitride platelets having a predetermined orientation in the hardened matrix material.

By this method, the at least one portion of the 3D component part formed from the filamentary structure disclosed herein can be obtained.

The ink composition used for the method for making the 3D printed component part comprises a matrix material and filler particles, wherein the filler particles comprise hexagonal boron nitride particles comprising hexagonal boron nitride platelets. The matrix material and the filler particles have been described above in more detail. The ink composition may further comprise secondary fillers as described above.

A continuous strand comprising the ink composition is extruded from a nozzle, and the continuous strand is deposited on a substrate in a predetermined pattern layer by layer to form the filamentary structure. The continuous strand being deposited layer by layer forms a stack of layers of the continuous strand.

In some embodiments, only one single layer is deposited. An application example where only one single layer may be deposited are heat spreaders for LED applications, where heat is spreaded within a layer having a high in-plane thermal conductivity and a texture index of more than 8. Another application example where only one single layer may be deposited is a cooling plate or pad for a battery for automotive electrification, the cooling plate or pad having a high through-plane thermal conductivity to remove heat from the battery cells by transporting it to the cooling plate or pad.

In other embodiments, a plurality of layers of the continuous strand is deposited. As used herein, "a plurality of layers" means that at least two layers or more layers are deposited. The number of layers is not particularly limited, for example, 5, 10, 20, 30, 50, 100 or more layers may be deposited. The continuous strand may be deposited continuously on the substrate without interruptions, or may be deposited in multiple portions, each portion being deposited continuously.

The substrate may be planar. The substrate may also have a 3D contour, for example for electronic applications. The material of the substrate is not specifically limited, it may be of metal, glass, ceramics, graphite, or of a polymer material, for example. The substrate may also be, for example, a CPU or a cooling plate or pad. If the substrate has a 3D contour, the predetermined pattern for 3D printing can be adapted to the 3D contour. In some embodiments, the nozzle can be tilted to adapt the deposition of the continuous strand to an inclined area of the substrate. This is possible for a deposition for high in-plane thermal conductivity, with an aspect ratio of the continuous strand of more than 2, as well as for a deposition for high through-plane thermal conductivity, with an aspect ratio of the continuous strand of less than 1. In some embodiments with a deposition for high through-plane thermal conductivity and with an aspect ratio of the continuous strand of less than 1, the nozzle is rotated at a certain angle, as the deposition of the continuous strand is limited to one side of the nozzle (see FIGS. 9 A-9 D). The rotation of the nozzle is not being carried out continuously but only at a certain angle to allow the deposition of the continuous strand in a different direction.

In some applications of the 3D printed component part, it is possible to remove the substrate after the 3D printing process has been completed.

At least one part of the continuous strand may be deposited in portions being oriented parallelly to one another. Specifically, at least 25%, or at least 50%, or at least 90% of the continuous strand may be deposited in portions being oriented parallelly to one another.

The portions being deposited parallelly to one another may be deposited in the same direction of deposition, or may be deposited in alternating directions of deposition. Preferably, the portions being deposited parallelly to one another are deposited in the same direction of deposition.

The continuous strand is extruded from a nozzle and deposited on a substrate. For depositing the continuous strand on a substrate, a 3D printer or a robot may be used. The 3D printer is operating according to the principle of liquid deposition modelling (LDM). By LDM, a liquid ink composition is deposited on a substrate in the shape of a continuous strand, thereby forming the filamentary structure.

In the 3D printer, the liquid ink is transported from a reservoir, e.g. by air pressure, and is dosed to the nozzle. Dosing may be carried out by compressed air, by micro extrusion using a screw, by a peristaltic pump, or by a progressive cavity pump. Optionally, different components of the ink composition, for example two-component resins, can be mixed subsequently to passing two dosing units, for example in a mixing chamber or by using a static mixer. From the nozzle, a continuous strand is extruded and deposited on a substrate. For depositing the continuous strand on the substrate, the nozzle is moved, for example using a positioning robot. The positioning robot may be a 3-axis robot with a robot arm, a delta positioning equipment or a positioning robot with linear guiding.

By 3D printing using a liquid deposition modelling method, by methods known in the art typically filamentary structures are printed having a dense shell and an inner structure with voids resulting in a low filling ratio and a low density of the filamentary structure and of the 3D printed component part. The filling ratio is the ratio of volume filled to the total volume of the sample. The filling ratio can also be expressed as a percentage by multiplying the ratio with 100. The lower the filling ratio, the faster the printing process of the filamentary structure. The infill pattern of the inner structure can consist of linear strands crossing each other perpendicularly, or can be hexagonal honeycomb-like structures. The inner structure comprises hollow volumes filled with air, the hollow volumes occupying the largest part of the inner volume of the 3D printed component parts. Typically, the hollow volumes amount to about 80% or more of the 3D printed component parts.

In known methods of liquid deposition modelling, clay is used to print 3D component parts. A reservoir of clay is put under air-pressure to be fed into a mini-extruder where thinning of the clay takes place. The thinned clay is forced through the nozzle of the LDM 3D printer and a continuous strand of clay is deposited forming a first layer. Under static conditions, the deposited continuous strand thickens sufficiently to support the next layer. Typically, the continuous strand has a ratio of the width of the continuous strand to the height of the continuous strand of about 2:1 to 4:1. The 3D printed filamentary structure is dried and subsequently fired.

By the 3D printing method disclosed herein, highly oriented boron nitride platelets in the deposited continuous strand, in the filamentary structure formed and in the 3D printed component part are achieved, resulting in highly textured filamentary structures and 3D printed component parts that are obtained. By using printing parameters not being typically used in the art, unusual filling patterns and/or nozzle geometries, a predetermined orientation of boron nitride platelets can be obtained The continuous strand may be deposited in multiple portions. As described above, a plurality of layers of the continuous strand may be deposited. The continuous strand of a first layer deposited on the substrate is sufficiently mechanically stable to support a second layer. The mechanical stability of each layer can be achieved by using high viscosity ink compositions, or by using thixotropic ink compositions with increasing viscosity when no shear is applied, or by hardening each portion of the continuous strand or each layer, for example by UV curing or thermal curing of the polymer resin if a polymer resin is used as matrix material.

The continuous strand is deposited on a substrate in a predetermined pattern layer by layer. In one layer, the continuous strand may comprise periodic patterns of deposited portions, for example portions being oriented parallelly to one another. In one layer, the continuous strand may consist of portions being oriented parallelly to one another. The continuous strand may be deposited in portions having close contact to one another, or overlapping each other. The overlap typically may be to an extent of up to 10 or up to 50%. The overlap may also be up to <100%. An overlap of up to 50% can be advantageous for low viscosity ink compositions where parallel portions of the continuous strand will flow together. As used herein, concentric portions having a circular shape are also to be understood as being "oriented parallelly to one another".

The deposited portions of the continuous strand and the continuous strand have a width and a height. The height of the continuous strand corresponds to the height of a 3D printed layer. As used herein, the ratio of the width of the continuous strand to the height of the continuous strand is also referred to as aspect ratio of the continuous strand.

In some embodiments, at least two portions of the continuous strand being oriented parallelly to one another are deposited, or at least three portions of the continuous strand being oriented parallelly to one another are deposited, or at least five portions of the continuous strand being oriented parallelly to one another are deposited, the parallel portions of the continuous strand having a total width of at least 0.5 mm or of at least 1 mm, and at least two layers, or at least three layers, or at least five layers being deposited.

The continuous strand may comprise portions being oriented parallelly to one another and being deposited in the same direction of deposition. The continuous strand may comprise portions being oriented parallelly to one another and being deposited in the same and in an opposite direction of deposition, for example in an alternating manner.

The continuous strand may comprise portions being oriented perpendicular to one another, or being inclined to one another with an angle of from 0° to 90°.

The continuous strand is deposited on a substrate in a predetermined pattern layer by layer. If more than one layer is deposited, the continuous strand may comprise periodic patterns of deposited portions from layer to layer. The continuous strand may comprise deposited portions in one layer being oriented parallelly to deposited portions in another layer. A large proportion of the continuous strand may be deposited in portions being oriented parallelly to one another in each single layer, and a large proportion of the continuous strand may be deposited in portions in one layer being oriented parallelly to portions deposited in another layer. By "a large proportion" it is meant that 80% or more, or 90% or more, or even 100% of the continuous strand are deposited in portions being oriented parallelly to one another.

For two consecutive layers, the successive layer may be deposited with respect to the previous layer by rotation with an angle of from 0° to 360°. The rotation may be clockwise or counterclockwise.

For two consecutive layers, the successive layer may be deposited with an offset with respect to the previous layer.

Figure 10A:
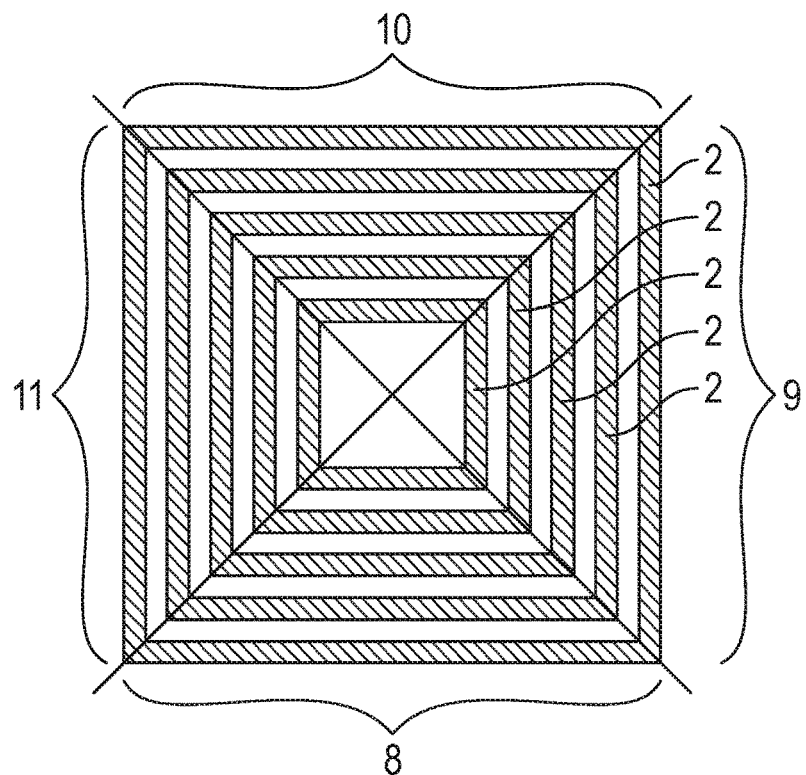
FIGS. 10 A-10 E show examples of predetermined patterns that can be used for depositing of a continuous strand during 3D printing of the filamentary structure disclosed herein.
Figure 10B:
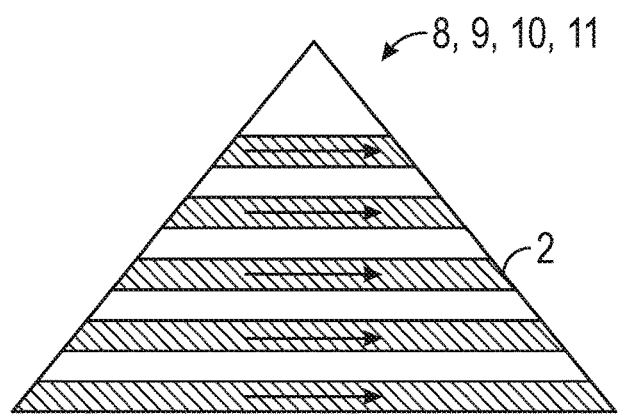
Figure 10C:
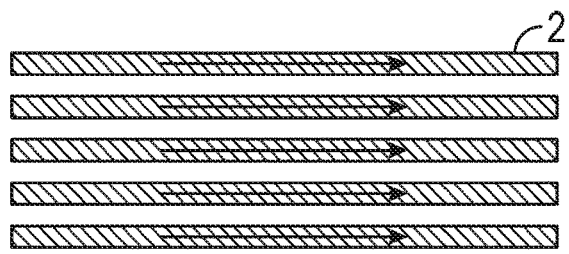
Figure 10E:
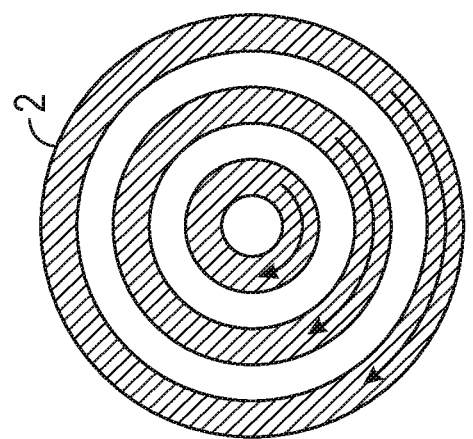
Figure 10D:
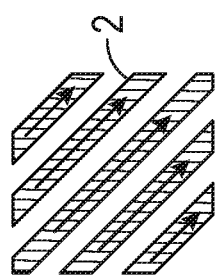

An example for a predetermined pattern for depositing the continuous strand in one layer is schematically shown in FIG. 10A. The continuous strand 2 is deposited in one layer in portions being oriented parallelly to one another. The pattern of FIG. 10 has four parts 8, 9, 10, 11, and in each of these parts the continuous strand is deposited in portions being oriented parallelly to one another and being deposited in the same direction of deposition. The individual portions of the continuous strand may be in close connection to one another, or may overlap each other. In FIG. 10 A the individual portions are shown with a certain distance to each other to better show how the individual portions are deposited. FIG. 10 B shows one of the four parts 8, 9, 10, 11. The arrows in FIG. 10 B indicate the direction of deposition. From layer to layer, this pattern may be repeated, the deposited portions of the first layer being oriented parallelly to the deposited portions of the second layer and of all further layers.

Other examples for predetermined pattern for depositing the continuous strand in one layer are schematically shown in FIGS. 10 C-10 E. In FIGS. 10 C and 10 D, the continuous strand 2 is deposited in one layer in portions being oriented parallelly to one another. All portions of the continuous strand are oriented parallelly to one another, and all portions are deposited in the same direction. In FIG. 10 E, the continuous strand 2 is deposited in one layer in concentric portions having a circular shape.

Predetermined patterns used for the 3D printing method disclosed herein usually do not comprise a shell structure as in known methods of 3D printing. A shell structure is not required, as dense structures are printed.

In some embodiments of the method and of the filamentary structure disclosed herein, the ratio of the width of the continuous strand to the height of the continuous strand is more than 2:1 which means more than 2. The hexagonal boron nitride platelets have a basal plane, and the basal plane of the hexagonal boron nitride platelets is oriented parallelly to the substrate on which the filamentary structure is deposited. The basal plane of the hexagonal boron nitride platelets in each layer is oriented parallelly to the basal plane of the hexagonal boron nitride platelets in each previous layer. The orientation of the boron nitride platelets being parallel to the substrate and to each previous layer can be determined by measuring the texture index of the resulting 3D printed component part, on a sample with one major surface of the sample being arranged in a direction parallel to the substrate, and the one major surface of the sample being oriented parallelly to the surface of the sample holder of the XRD measurement.

As used herein, the orientation of the boron nitride platelets being parallel to the substrate means that the resulting 3D printed component parts have a high texture index of at least 8. More specifically, the texture index may be at least 10, or at least 12, or at least 15, or at least 20, or at least 30, or at least 50, or at least 100. The ratio of the width of the continuous strand to the height of the continuous strand of these embodiments is more than 2 and may be at least 3, or at least 4, or at least 5, or at least 10, or at least 20. The ratio of the width of the continuous strand to the height of the continuous strand may also be referred to as the aspect ratio of the continuous strand. A high aspect ratio of the continuous strand of more than 2 will lead to high values of in-plane thermal conductivity, and the values of in-plane thermal conductivity will increase with increasing aspect ratio of the continuous strand.

The orientation of the hexagonal boron nitride platelets can be seen by optical microscopy on polished cross sections of the 3D printed matrix material-boron nitride composite, after a treatment with $KMnO_4$ for 5 minutes at 60° C. If no sufficient contrast can be achieved, the treatment has to be repeated. By this method, it is possible to detect if the complete 3D printed component part is textured in the same manner or if only selected sections of the component part are textured in the same manner. It can also be detected if the hexagonal boron nitride platelets are oriented with a high or a low texture index in the complete component part or in sections of the component part. A representative sample can be taken of the complete component part if the complete component part is textured in the same manner, or of sections of the component part if only selected sections of the component part are textured in the same manner.

If the aspect ratio of the continuous strand is more than 2, the height of the continuous strand may be 500 μm or less. More specifically, the height of the continuous strand may be at most 200 μm, or at most 100 μm. The height of the continuous strand may also be at most 50 μm, or even at most 20 μm.

If the aspect ratio of the continuous strand is more than 2, the continuous strand is deposited with a filling ratio of at least 50%, or of at least 60%, or at least 70%, or of at least 80%, or of at least 90%, or of at least 95%. A filling ratio of 90% or more or of 95% or more is not used in known methods of liquid deposition modelling, as the printing process is slow in this case, and for 3D printed component parts printed from clay materials the subsequent drying would result in cracks in the printed thicker walls. The liquid deposition process known in the art for clay materials is therefore only applicable for thin walled parts or thin walled infill structures.

The filling ratio can be determined on polished cross sections of the 3D printed matrix material-boron nitride composite.

In some embodiments of the method and of the filamentary structure disclosed herein, the ratio of the width of the continuous strand to the height of the continuous strand is less than 1. The hexagonal boron nitride platelets have a basal plane, and the basal plane of the hexagonal boron nitride platelets is oriented perpendicularly to the substrate on which the filamentary structure is deposited. The orientation of the boron nitride platelets being perpendicular to the substrate and to each previous layer can be determined by measuring the texture index of the resulting 3D printed component part, on a sample with one major surface of the sample being arranged in a direction parallel to the substrate, and the one major surface of the sample being oriented parallelly to the surface of the sample holder of the XRD measurement.

As used herein, the orientation of the boron nitride platelets being perpendicular to the substrate means that the resulting 3D printed component parts have a low texture index of less than 1. More specifically, the texture index may be at most 0.9, or at most 0.8, or at most 0.5, or at most 0.2, or at most 0.1, or at most 0.05, or at most 0.01. The ratio of the width of the continuous strand to the height of the continuous strand, i.e. the aspect ratio of the continuous strand, of these embodiments is less than 1 and may be at most 0.9, or at most 0.7, or at most 0.5. The aspect ratio may also be at most 0.3 or at most 0.1. A low aspect ratio of the continuous strand of less than 1 will lead to high values of through-plane thermal conductivity, and the values of through-plane thermal conductivity will increase with decreasing aspect ratio of the continuous strand.

If the aspect ratio of the continuous strand is less than 1, the continuous strand is deposited with a filling ratio of at least 90%, or of at least 95%. The continuous strand may comprise deposited portions having close contact to one another, or overlapping each other. The overlap may be to an extent of 2 to 10%. The continuous strand may comprise deposited portions being oriented parallelly to one another. The continuous strand may consist of deposited portions being oriented parallelly to one another. The portions being oriented parallelly to one another may be deposited in the same direction of deposition.

In the method for making a 3D printed component part disclosed herein, a continuous strand is extruded from a nozzle. The nozzle may be made from metal, for example from steel, or from a polymer material such as a thermoplastic material or a duroplastic material. Useful thermoplastic materials are polypropylene, polyethylene, polycarbonate and polyamide, useful duroplastic materials are epoxy and acrylic materials and polyurethane. Metallic nozzles coated with polytetrafluoroethylene or nozzles made from polytetrafluoroethylene may also be used. Various types of nozzles and nozzle arrangements are shown in the Figures (FIGS. 1 A-1 D, 2 A-2 D, 3 A-3 D, 4 A-4D, 5 A-5 D, 6 A-6 D, 7 A-7 D, 8 A-8 D and 9 A-9 D).

FIGS. 1 A-1 D show a standard nozzle with a standard deposition arrangement as used in known methods of 3D printing. The nozzle is round with a tapered tip at the outlet opening (see FIG. 1 B showing the nozzle in a cross-sectional view parallel to the substrate, and FIG. 1 C showing a vertical cross-sectional view of the nozzle). FIG. 1 A shows the round nozzle 1 with the continuous strand 2 being deposited on the substrate 3. The arrow on top of FIG. 1 A shows the nozzle movement during 3D printing which is in "x" direction and may also be in "y" direction, or in any "(x, y)" direction, relative to the substrate. For the next layer, the nozzle is moved in the "z" direction and the next layer is printed. The nozzle opening 4 has a circular shape. The distance of the nozzle tip to the substrate is at least the diameter of the nozzle opening 4. FIG. 1 D shows a cross-sectional view of the deposited continuous strand. The ratio of the width of the continuous strand to the height of the continuous strand, i.e. the aspect ratio of the continuous strand, is from 1 to 2. The boron nitride platelets are oriented parallelly to the walls of the continuous strand, resulting in a substantially isotropic orientation in the continuous strand.

FIGS. 2 A-2 D show a round nozzle with a flat deposition arrangement. The nozzle is round with a tapered tip at the outlet opening (see FIG. 2 B showing the nozzle in a cross-sectional view parallel to the substrate, and FIG. 2 C showing a vertical cross-sectional view of the nozzle). FIG. 2 A shows the round nozzle 1 with the continuous strand 2 being deposited on the substrate 3. The arrow on top of FIG. 2 A shows the nozzle movement during 3D printing which is in "x" direction and may also be in "y" direction, or in any "(x, y)" direction, relative to the substrate. For the next layer, the nozzle is moved in the "z" direction and the next layer is printed. The nozzle opening 4 has a circular shape. The deposition arrangement is a flat deposition which is not known from standard methods of 3D printing. The flat deposition is a result of the low distance from nozzle tip to substrate which is lower than the diameter of the nozzle opening and lower than in the situation of FIG. 1 A. FIG. 2 D shows a cross-sectional view of the deposited continuous strand. The ratio of the width of the continuous strand to the height of the continuous strand, i.e. the aspect ratio of the continuous strand, is more than 2 and about 10 in the example of FIG. 2 D. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 3 A-3 D show a rectangular nozzle. A rectangular nozzle is not known from standard 3D printing methods. The nozzle has a rectangular cross-section and is tapered at the outlet opening (see FIG. 3 B showing the nozzle in a cross-sectional view parallel to the substrate, and FIG. 3 C showing a vertical cross-sectional view of the nozzle). FIG. 3 A shows the rectangular nozzle 1 with the continuous strand 2 being deposited on the substrate 3. The arrow on top of FIG. 3 A shows the nozzle movement during 3D printing which is in "x" direction relative to the substrate for printing one layer. 3D printing in the "y" direction, and in any "(x, y)" direction, is also possible by rotating the nozzle to the desired direction. For the next layer, the nozzle is moved in the "z" direction and the next layer is printed. The nozzle opening 4 has a rectangular shape. The distance of the nozzle tip to the substrate is at least the width of the nozzle opening 4 in the direction of the nozzle movement. FIG. 3 D shows a cross-sectional view of the deposited continuous strand. The ratio of the width of the continuous strand to the height of the continuous strand, i.e. the aspect ratio of the continuous strand, is more than 2 and about 6 in the example of FIG. 3 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 4 A-4 D show the rectangular nozzle of FIGS. 4 A-4 C. The nozzle has a rectangular cross-section and is tapered at the outlet opening (see FIG. 4 B showing the nozzle in a cross-sectional view parallel to the substrate, and FIG. 4 C showing a vertical cross-sectional view of the nozzle). FIG. 4 A shows the rectangular nozzle 1 with the continuous strand 2 being deposited on the substrate 3. The arrow on top of FIG. 4 A shows the nozzle movement during 3D printing which is in "x" direction relative to the substrate for printing one layer. 3D printing in the "y" direction, and in any "(x, y)" direction, is also possible by rotating the nozzle to the desired direction. For the next layer, the nozzle is moved in the "z" direction and the next layer is printed. The nozzle opening 4 has a rectangular shape. The deposition arrangement is a flat deposition which is not known from standard methods of 3D printing. The flat deposition is a result of the low distance from nozzle tip to substrate. The distance of the nozzle tip to the substrate is lower than the width of the nozzle opening 4 in the direction of the nozzle movement, and lower than in the situation of FIG. 3 A. FIG. 4 D shows a cross-sectional view of the deposited continuous strand. The ratio of the width of the continuous strand to the height of the continuous strand, i.e. the aspect ratio of the continuous strand, is more than 2 and larger than in the example of FIGS. 3 A and 3 D, and is about 20 in the example of FIG. 4 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 5 A-5 D show a rectangular nozzle. The nozzle has a rectangular cross-section and is tapered at the outlet opening in the direction of the nozzle movement, and has a wiper 5 with a flat surface parallel to the substrate (see FIG. 5 B showing the nozzle in a cross-sectional view parallel to the substrate, and FIG. 5 C showing a vertical cross-sectional view of the nozzle). The rectangular nozzle of FIGS. 5 A-5 D may be used advantageously for flat substrates. FIG. 5 A shows the rectangular nozzle 1 with the continuous strand 2 being deposited on the substrate 3. The arrow on top of FIG. 5 A shows the nozzle movement during 3D printing which is in "x" direction relative to the substrate for printing one layer. 3D printing in the "y" direction, and in any "(x, y)" direction, is also possible by rotating the nozzle to the desired direction. For the next layer, the nozzle is moved in the "z" direction and the next layer is printed. The nozzle opening 4 has a rectangular shape. The deposition arrangement is a flat deposition which is not known from standard methods of 3D printing. The flat deposition is a result of the low distance from nozzle tip to substrate. The distance of the nozzle tip to the substrate is lower than the width of the nozzle opening 4 in the direction of the nozzle movement. The shear of the boron nitride platelets during deposition of the continuous strand may be increased by using the nozzle of FIG. 5 A. FIG. 5 D shows a cross-sectional view of the deposited continuous strand. The ratio of the width of the continuous strand to the height of the continuous strand, i.e. the aspect ratio of the continuous strand, is more than 2 and larger than in the example of FIGS. 3 A and 3 D, and is about 20 in the example of FIG. 5 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 6 A-6 D show a rectangular nozzle. The nozzle has a rectangular cross-section and has wipers 5, 6 with a flat surface parallel to the substrate in the direction of the nozzle movement and at an opposite side of the nozzle (see FIG. 6 B showing the nozzle in a cross-sectional view parallel to the substrate, and FIG. 6 C showing a vertical cross-sectional view of the nozzle). The rectangular nozzle of FIGS. 6 A-6 C may be used advantageously for flat substrates and for printing continuous strands with a high aspect ratio. FIG. 6 A shows the rectangular nozzle 1 with the continuous strand 2 being deposited on the substrate 3. The arrow on top of FIG. 6 A shows the nozzle movement during 3D printing which is in "x" direction relative to the substrate for printing one layer. 3D printing in the "y" direction, and in any "(x, y)" direction, is also possible by rotating the nozzle to the desired direction. For the next layer, the nozzle is moved in the "z" direction and the next layer is printed. The nozzle opening 4 has a rectangular shape. The deposition arrangement is a flat deposition which is not known from standard methods of 3D printing. The flat deposition is a result of the low distance from nozzle tip to substrate. The distance of the lower nozzle surface at the outlet opening to the substrate is lower than the width of the nozzle opening 4 in the direction of the nozzle movement. The shear of the boron nitride platelets during deposition of the continuous strand may be further increased by using the nozzle of FIG. 6 A. FIG. 6 D shows a cross-sectional view of the deposited continuous strand. The ratio of the width of the continuous strand to the height of the continuous strand, i.e. the aspect ratio of the continuous strand, is more than 2 and larger than in the example of FIGS. 3 A and 3 D, and is about 20 in the example of FIG. 6 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 7 A-7 D shows another example of a round nozzle. The round nozzle is tapered towards the outlet opening, with a flat area at the outlet opening (see FIG. 7 B showing the nozzle in a cross-sectional view parallel to the substrate, and FIG. 7 C showing a vertical cross-sectional view of the nozzle). The round nozzle of FIGS. 7 A-7 C may be used advantageously for flat substrates and for printing continuous strands with a high aspect ratio. FIG. 7 A shows the round nozzle 1 with the continuous strand 2 being deposited on the substrate 3. The arrow on top of FIG. 7 A shows the nozzle movement during 3D printing which is in "x" direction and may also be in "y" direction, and in any "(x, y)" direction, relative to the substrate. For the next layer, the nozzle is moved in the "z" direction and the next layer is printed. The nozzle opening 4 has a circular shape. The deposition arrangement is a flat deposition which is not known from standard methods of 3D printing. The flat deposition is a result of the low distance from nozzle tip to substrate. The distance of the lower nozzle surface at the outlet opening to the substrate is lower than the width of the nozzle opening 4 in the direction of the nozzle movement. The shear of the boron nitride platelets during deposition of the continuous strand may be increased by using the nozzle of FIG. 7 A. FIG. 7 D shows a cross-sectional view of the deposited continuous strand. The ratio of the width of the continuous strand to the height of the continuous strand, i.e. the aspect ratio of the continuous strand, is more than 2 and is about 20 in the example of FIG. 7 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 8 A-8 D shows another example of a rectangular nozzle. The nozzle has a rectangular cross-section and is tapered at the outlet opening (see FIG. 8 B showing the nozzle in a cross-sectional view parallel to the substrate, and FIG. 8 C showing a vertical cross-sectional view of the nozzle). The rectangular nozzle of FIGS. 8 A-8 C has an insert 7 which splits and recombines the ink which is transported through the nozzle. The rectangular nozzle of FIGS. 8 A-8 C may be used advantageously for printing continuous strands with a high aspect ratio and with the boron nitride platelets being oriented parallelly to the substrate. FIG. 8 A shows the rectangular nozzle 1 with the continuous strand 2 being deposited on the substrate 3. The arrow on top of FIG. 8 A shows the nozzle movement during 3D printing which is in "x" direction relative to the substrate for printing one layer. 3D printing in the "y" direction, and in any "(x, y)" direction, is also possible by rotating the nozzle to the desired direction. For the next layer, the nozzle is moved in the "z" direction and the next layer is printed. The nozzle opening 4 has a rectangular shape. The deposition arrangement is a flat deposition which is not known from standard methods of 3D printing. The flat deposition is a result of the low distance from nozzle tip to substrate. The distance of the nozzle tip at the outlet opening to the substrate is lower than the width of the nozzle opening 4 in the direction of the nozzle movement. The shear of the boron nitride platelets during deposition of the continuous strand may be increased by using the nozzle of FIG. 8 A. FIG. 8 D shows a cross-sectional view of the deposited continuous strand. The ratio of the width of the continuous strand to the height of the continuous strand, i.e. the aspect ratio of the continuous strand, is more than 2 and is about 20 in the example of FIG. 8 B. The boron nitride platelets are oriented parallelly to the walls of the continuous strand and parallelly to the substrate. With this nozzle and a flat deposition, 3D printed component parts can be made having a high texture index of at least 8 and having a high in-plane thermal conductivity.

FIGS. 9 A-9 D shows another example or a rectangular nozzle. The nozzle has a rectangular cross-section and is tapered at the outlet opening (see FIG. 9 B showing the nozzle in a cross-sectional view parallel to the substrate, and FIG. 9 C showing a vertical cross-sectional view of the nozzle). The outlet opening of the rectangular nozzle of FIGS. 9 A-9 C is at one of the tapered sides and at the bottom of the nozzle. The rectangular nozzle of FIGS. 9 A-9 C may be used advantageously for printing continuous strands with a low aspect ratio and with the boron nitride platelets being oriented perpendicularly to the substrate. FIG. 9 A shows the rectangular nozzle 1 with the continuous strand 2 being deposited in parallel portions on the substrate 3. The arrow on top of FIG. 9 A shows the nozzle movement during 3D printing of one layer which is in "y" direction relative to the substrate for printing one portion of the continuous strand and in "x" direction relative to the substrate for moving the nozzle to print the next portion of the continuous strand in the "y" direction. For the next layer, the nozzle is moved in the "z" direction and the next layer is printed. The nozzle opening 4 has a square shape. FIG. 9 D shows a cross-sectional view of one of the parallel portions of the deposited continuous strand. The ratio of the width of the continuous strand to the height of the continuous strand, i.e. the aspect ratio of the continuous strand, is less than 1 and is about 0.5 in the example of FIG. 9 B. The boron nitride platelets are oriented parallelly to the walls of the continuous strand and perpendicularly to the substrate. With this nozzle and this kind of deposition, 3D printed component parts can be made having a low texture index of less than 1 and having a high through-plane thermal conductivity.

The filamentary structure obtained by extruding the continuous strand from a nozzle and depositing the continuous strand on a substrate, is hardened to form a 3D printed component part. The 3D printed component part comprises the hardened matrix material and the hexagonal boron nitride particles comprising hexagonal boron nitride platelets dispersed therein. The hexagonal boron nitride platelets have a predetermined orientation in the hardened matrix material.

If a polymer resin is used as matrix material, the 3D printable ink composition comprises an uncured polymer resin and a curing agent, and the hardening of the filamentary structure is done by curing. The activation of the curing agent may be thermally or by radiation, for example by UV radiation.

If a sol-gel system is used as matrix material, the 3D printable ink composition may be hardened thermally or by radiation, for example by drying or by applying UV radiation.

The hardening may be done either simultaneously with the deposition of the filamentary structure, for example after the deposition of each layer, or may be done as a separate step after the complete filamentary structure has been deposited. It is also possible to harden each layer partially, i.e. increase the viscosity of the layer, and continue with the 3D printing process, or to harden a first part of the filamentary structure while a second part of the filamentary structure is still being deposited.

The hardening may be carried out thermally or by radiation, for example by UV radiation.

The 3D printed component part disclosed herein may be used as thermal conduction means to control the temperature of electrical and electronic components or assemblies or batteries.

The present disclosure will be described in more detail by the following examples.

EXAMPLES AND COMPARATIVE EXAMPLE

Example 1 (EX1)

57 g of acrylic resin (SKresin 1390, S u. K Hock GmbH, Regen, Germany) is homogenized with 43 g of 3M™ Boron Nitride Cooling Filler Platelets CFP 007 HS in a PE vessel (180 ml) by a dual asymmetric centrifugal laboratory mixer (Speedmixer™ DAC 600.1 from Hauschild, Hamm, Germany). The boron nitride platelets have a mean particle size ($d_{50}$) of 6.3 µm, measured by laser diffraction (Mastersizer 2000, wet measurement), a specific surface area (BET) of 11 $m^2/g$ and a content of water-soluble boron compounds of <0.1 wt.-%. The mean aspect ratio of the boron nitride platelets is 17. Before homogenizing, the mixing chamber of the mixer is degassed for 30 seconds (200 mbar). The mixing parameters are 30 seconds at 800 rpm followed by 30 seconds at 2000 rpm. While mixing, a low pressure of 200 mbar is applied.

The homogenized boron nitride-resin mix is filled into a vessel (50 ml, 28 mm diameter) to measure the viscosity (Brookfield, Type RVDV-II+PX). The viscosity is 3,800,000 mPa*s, measured at 1 rpm, 25° C., spindle 7. For the measurement, the spindle is placed centrically into the vessel.

The homogenized boron nitride filled resin is a 3D printable ink composition and is filled into a PTFE tube by a syringe (60 ml). The tube is connected to the printer (Delta Wasp 2040, CSP s.r.l., Massa Lombarda, Italy) and charged with 1 bar compressed air.

For 3D printing, the software program Cura 3.1.0 (Ultimaker B.V., Geldermalsen, The Netherlands) is used. The sample or component part to be printed has the dimensions 40×40×2.2 $mm^3$.

The 3D printer is set to operate in the liquid deposition modelling mode. The preparation of printing is performed according to manufacturer's instructions.

The boron nitride filled resin is 3D printed on an adhesive paper substrate (Post-it® Super Sticky 2900BY 73×73 mm, available from 3M Deutschland GmbH, Germany) adhering on the printing plate of the 3D printer using a round nozzle and a flat deposition as shown in FIGS. 2 A-2 C. The inner diameter of the steel nozzle is 750 µm, the outer diameter of the nozzle tip is 1100 µm. A continuous strand is extruded from the nozzle and deposited on the paper substrate to form a filamentary structure. The predetermined pattern of the continuous strand is shown in FIG. 10 A. While printing, a 250 W UV lamp (Albert Kerbl GmbH, Buchbach, Germany) is activating the curing of the filamentary structure. The distance of the lamp to the sample is 35 cm. After each layer, the printing process is interrupted for 10 seconds to harden each layer and to clean the nozzle with a cloth. 45 layers are printed with the predetermined pattern of FIG. 10 A. The filling ratio (Cura:infill density) is set to 99%. The individual portions of the continuous strand are oriented parallelly to one another and are in close contact to each other. The substrate is completely covered with the continuous strand, i.e. with the individual portions of the continuous strand. While depositing layer by layer, macroscopically no voids can be observed.

The curing is carried out for 24 hours under the 250 W UV lamp. The printed sample can then be removed from the substrate, the complete sample is turned upside down and is cured for another 24 hours under the 250 W UV lamp. During printing and curing, a weight loss of the filamentary structure can be observed by evaporation of organic volatile components of the resin. The boron nitride content of the boron nitride filled resin increases from initially 43 wt.-% to 73 wt.-% (73 wt.-% correspond to 58.5 vol.-%).

Two smaller samples with the dimensions 12×10×2 mm³ are cut out of the printed sample, in a direction parallel to the substrate.

From one of the two samples with the dimensions 12×10×2 mm³, 5 stripes with the dimensions 10×2×2 mm³ are cut out of the sample. Each stripe is turned individually by 90° over its long axis, and the 5 stripes are then stacked to obtain a 10×10×2 mm³ sample which is used for the measurement of the in-plane thermal conductivity.

On the other one of the two samples with the dimensions 12×10×2 mm³, the through-plane thermal conductivity is measured. On this sample, also the texture index (TI) is measured, with one major surface of the sample of dimensions 12×10 mm³ being oriented parallelly to the surface of the sample holder of the XRD measurement. The texture index is measured as described above. The texture index measured on this sample corresponds to the texture index of the 3D printed component part with the dimensions 40×40×2.2 mm³. The intensity measured for the (002) reflection is 3779, the intensity measured for the (100) reflection is 39, and the determined texture index is 13.2.

For measuring thermal conductivity, the laser-flash method is used and carried out with the Nanoflash LFA 447 (Netzsch, Selb, Germany) according to ISO 22007-4:2017. Measurements are taken at 25° C. Thermal conductivity (TC) is determined by measuring the values for thermal diffusivity a and density D, and calculating the specific heat capacity $c_p$ from the specific heat capacity of the acrylic resin and specific heat capacity of boron nitride, and is calculated from these values according to the equation TC=a*$c_p$*D. The specific heat capacity $c_p$ of the acrylic resin is 1.47 J/(g*K), and the specific heat capacity $c_p$ of boron nitride is 0.80 J/(g*K). The thermal diffusivity a is measured with the Nanoflash LFA 447 (Netzsch, Selb, Germany) on the samples that are produced as described above, having the dimensions 10×10×2 mm³. The standard Pyroceram 9606 is used for calibration of the measurement.

Width and height of the continuous strand are measured with an optical microscope. The height of the continuous strand corresponds to the height of a single layer.

Density is measured on the 3D printed 40×40×2.2 mm³ sample by the Archimedes method. The theoretical density of the acrylic resin-boron nitride composite is 1.81 g/cm³. The results are shown in table 1.

Example 2 (EX2)

For Example 2, all steps are repeated according to Example 1, with the exception that hexagonal boron nitride platelets having a mean particle size ($d_{50}$) of 13 μm are used instead of CFP 007 HS. The boron nitride platelets have a specific surface area (BET) of 8.3 m²/g and a content of water soluble boron compounds of <0.1 wt.-%. The mean aspect ratio of the boron nitride platelets is 31. The viscosity of the homogenized boron nitride-resin mix is 250,000 mPa*s measured at 10 rpm, 25° C., spindle 7. The mean particle size of the boron nitride platelets was measured by laser diffraction (Mastersizer 2000, wet measurement). The boron nitride content of the boron nitride filled resin of the 3D printed sample with the dimensions 40×40×2.2 mm³ is 73 wt.-%, corresponding to 58.5 vol.-%. The texture index measured on the sample as described for Example 1 is 202, the intensity measured for the (002) reflection is 12533, and the intensity measured for the (100) reflection is 8.5. The other results are shown in table 1.

TABLE 1

| Ex. No. | | strand height [μm] | strand width [μm] | aspect ratio strand | density [g/cm³] | rel. density [% TD] | thermal diffusivity [mm²/s] | TC*⁾ [W/m * K] |
|---|---|---|---|---|---|---|---|---|
| EX1 | | 36 | 658 | 18.3 | 1.16 | 64 | | |
| | in-plane | | | | | | 4.31 | 4.95 |
| | through-plane | | | | | | 1.61 | 1.85 |
| EX2 | | 31 | 648 | 20.9 | 1.32 | 73 | | |
| | in-plane | | | | | | 7.50 | 9.80 |
| | through-plane | | | | | | 0.88 | 1.14 |

*⁾TC = Thermal Conductivity

Examples 3 to 6 (EX3 to EX6)

Examples 3 to 6 show the texture index for 3D printed samples for different heights of the continuous strand, i.e. for different layer thicknesses of a 3D printed layer, with boron nitride platelets having a mean particle size ($d_{50}$) of 6.3 μm.

For Examples 3 to 6, all steps are repeated according to Example 1, with the exception that only one layer was printed. For Examples 3 to 6, the distance of the nozzle to the substrate was varied, with resulting heights of the continuous strand of 17 μm, 30 μm, 40 μm and 60 μm, respectively. The texture index is measured as described for Example 1, on a sample in a direction parallel to the substrate. The results are shown in table 2.

Examples 7 to 10 (EX7 to EX10)

Examples 7 to 10 show the texture index for 3D printed samples for different heights of the continuous strand, i.e. for different layer thicknesses of a 3D printed layer, with boron nitride platelets having a mean particle size ($d_{50}$) of 13 μm.

For Examples 7 to 10, all steps are repeated according to Example 2, with the exception that only one layer was printed. For Examples 7 to 10, the distance of the nozzle to the substrate was varied, with resulting heights of the continuous strand of 40 μm, 65 μm, 95 μm and 120 μm, respectively. The texture index is measured as described for Example 1, on a sample in a direction parallel to the substrate. The results are shown in table 2.

Example 11 (EX11)

Example 11 shows the texture index for a 3D printed sample with a height of 25 μm of the continuous strand, with boron nitride platelets having a mean particle size ($d_{50}$) of 13 μm. For Example 11, all steps are repeated according to Example 2, with the exceptions that only one layer was printed and the distance of the nozzle to the substrate was reduced, and furthermore, a flat nozzle and a flat deposition as shown in FIGS. 7 A-7 C was used instead of the nozzle of FIGS. 2 A-2 C. The inner diameter of the steel nozzle is 750 µm, the outer diameter of the nozzle tip is 2500 µm. The texture index is measured as described for Example 1, on a sample in a direction parallel to the substrate. The results are shown in table 2.

Comparative Example (CEX)

All steps are repeated according to Example 1, with the exceptions that only one layer was printed and the distance of the nozzle to the substrate was increased to have the standard deposition as shown in FIGS. 1 A-1 D. The aspect ratio of the resulting continuous strand was 2 (see table 2). The texture index is measured as described for Example 1, on a sample in a direction parallel to the substrate. The results are shown in table 2.

TABLE 2

| | strand height [µm] | strand width [µm] | aspect ratio strand | $I_{(002)}$ | $I_{(100)}$ | TI*) |
|---|---|---|---|---|---|---|
| EX3 | 17 | 660 | 38.8 | 247 | 1.6 | 21.2 |
| EX4 | 30 | 649 | 21.6 | 564 | 4.4 | 17.6 |
| EX5 | 40 | 653 | 16.3 | 493 | 4.1 | 16.5 |
| EX6 | 60 | 655 | 10.9 | 991 | 8.5 | 16.0 |
| EX7 | 40 | 645 | 16.1 | 4647 | 2.5 | 255 |
| EX8 | 65 | 654 | 10.1 | 5039 | 3.3 | 209 |
| EX9 | 95 | 652 | 6.9 | 5069 | 5.2 | 134 |
| EX10 | 120 | 645 | 5.4 | 5368 | 7.4 | 99.5 |
| EX11 | 25 | 655 | 26.2 | 3400 | 1.3 | 359 |
| CEX | 176 | 351 | 2.0 | 490 | 8.8 | 7.6 |

*)TI = Texture Index

The invention claimed is:

1. A filamentary structure manufactured during 3D printing by liquid deposition modelling, the filamentary structure comprising a continuous strand comprising a matrix material and filler particles, wherein the filler particles comprise hexagonal boron nitride particles comprising hexagonal boron nitride platelets, and wherein the ratio of the width of the continuous strand to the height of the continuous strand is either more than 2 or less than 1.

2. The filamentary structure of claim 1, wherein the boron nitride platelets have a mean aspect ratio of more than 7.

3. The filamentary structure of claim 1, wherein the mean particle size ($d_{50}$) of the boron nitride platelets is from 5 to 100 µm.

4. The filamentary structure of claim 1, wherein the matrix material is a polymer resin or a sol-gel system, and wherein the polymer resin is selected from the group consisting of acrylic resins, epoxy resins, polyurethane resins, silicone resins and mixtures thereof, and wherein the sol-gel system is selected from the group consisting of silica based sol-gel systems, alumina based sol-gel systems and titania based sol-gel systems.

5. The filamentary structure of claim 1, wherein the continuous strand comprises portions being oriented parallelly to one another.

6. A 3D printed component part comprising at least one portion formed from the filamentary structure of claim 1.

7. The component part of claim 6, wherein the at least one portion of the component part formed from the filamentary structure has a texture index of at least 8, and wherein the ratio of the width of the continuous strand to the height of the continuous strand in the filamentary structure is more than 2.

8. The component part of claim 6, wherein the at least one portion of the component part formed from the filamentary structure has a texture index of less than 1, and wherein the ratio of the width of the continuous strand to the height of the continuous strand in the filamentary structure is less than 1.

9. The component part according to claim 6, wherein the at least one portion of the component part formed from the filamentary structure has a relative density of at least 60% of the theoretical density of the filamentary structure.

10. A 3D printing method for making the 3D printed component part of claim 6, the method comprising
providing an ink composition, the ink composition comprising a matrix material and filler particles, wherein the filler particles comprise hexagonal boron nitride particles comprising hexagonal boron nitride platelets;
extruding a continuous strand from a nozzle and depositing the continuous strand on a substrate in a predetermined pattern layer by layer to form a filamentary structure, wherein the continuous strand comprises the ink composition; and
hardening the filamentary structure to form a 3D printed component part comprising a hardened matrix material and the hexagonal boron nitride particles comprising hexagonal boron nitride platelets dispersed therein, the hexagonal boron nitride platelets having a predetermined orientation in the hardened matrix material; wherein
(i) the ratio of the width of the continuous strand to the height of the continuous strand is more than 2, and wherein the hexagonal boron nitride platelets have a basal plane, and wherein the basal plane of the hexagonal boron nitride platelets in the hardened matrix material is oriented parallelly to the substrate, or
(ii) the ratio of the width of the continuous strand to the height of the continuous strand is less than 1, and wherein the hexagonal boron nitride platelets have a basal plane, and wherein the basal plane of the hexagonal boron nitride platelets in the hardened matrix material is oriented perpendicularly to the substrate.

11. The method of claim 10, wherein the ratio of the width of the continuous strand to the height of the continuous strand is more than 2, and wherein the hexagonal boron nitride platelets have a basal plane, and wherein the basal plane of the hexagonal boron nitride platelets is oriented parallelly to the substrate.

12. The method of claim 10, and wherein the ratio of the width of the continuous strand to the height of the continuous strand is less than 1, and wherein the hexagonal boron nitride platelets have a basal plane, and wherein the basal plane of the hexagonal boron nitride platelets is oriented perpendicularly to the substrate.

13. The method of claim 10, wherein at least one part of the continuous strand is deposited in portions being oriented parallelly to one another.

* * * * *